US011432484B2

(12) United States Patent
Williams et al.

(10) Patent No.: US 11,432,484 B2
(45) Date of Patent: *Sep. 6, 2022

(54) ENVIRONMENTAL SERVICES PLATFORM

(71) Applicant: ET Water Systems, Inc., Novato, CA (US)

(72) Inventors: Lee M. Williams, Novato, CA (US); Edwin Waldemar Veelo, Sonoma, CA (US); Kyle Prodromou Schien, San Rafael, CA (US)

(73) Assignee: ET Water Systems, Inc., Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,215

(22) Filed: Jul. 19, 2018

(65) Prior Publication Data

US 2018/0317407 A1 Nov. 8, 2018

Related U.S. Application Data

(63) Continuation of application No. 14/834,251, filed on Aug. 24, 2015, now Pat. No. 10,028,454.

(60) Provisional application No. 62/042,765, filed on Aug. 27, 2014, provisional application No. 62/057,908, filed on Sep. 30, 2014.

(51) Int. Cl.
*A01G 25/16* (2006.01)
(52) U.S. Cl.
CPC .................................. *A01G 25/167* (2013.01)
(58) Field of Classification Search
None
See application file for complete search history.

(56) References Cited

U.S. PATENT DOCUMENTS

| 8,572,290 B1 * | 10/2013 | Mukhopadhyay ...... H04L 43/50 |
| | | 709/251 |
| 2003/0149526 A1 * | 8/2003 | Zhou .................... G01S 5/0027 |
| | | 701/408 |

(Continued)

FOREIGN PATENT DOCUMENTS

| WO | 9939567 A1 | 8/1999 |
| WO | 2012142395 A1 | 10/2012 |

OTHER PUBLICATIONS

Final Office Action dated Jan. 12, 2018 of U.S. Appl. No. 14/834,251 by Williams, L. M., et al., filed Aug. 24, 2015.

(Continued)

*Primary Examiner* — Jason Lin
(74) *Attorney, Agent, or Firm* — Harness, Dickey & Pierce, P.L.C.

(57) ABSTRACT

Methods and systems are disclosed for an environmental services platform for providing optimized irrigation plans, water management and use analysis, automated irrigation. Scheduling via network connected irrigation controllers, and other automated environmental services. According to some embodiments, a user may input site survey data regarding a selected irrigation site to a network-connected environmental services platform. The environmental services platform may correlate and analyze the input site survey data with large scale sets of relevant data (e.g., soil data, geographic data, plant data, weather data, solar radiation data, etc.) to provide services associated with the platform.

18 Claims, 20 Drawing Sheets

(56) References Cited

U.S. PATENT DOCUMENTS

| | | | |
|---|---|---|---|
| 2003/0182022 A1 | 9/2003 | Addink et al. | |
| 2004/0030456 A1 | 2/2004 | Barlow et al. | |
| 2005/0171646 A1 | 8/2005 | Miller | |
| 2010/0305764 A1* | 12/2010 | Carr | A01G 25/16 713/400 |
| 2011/0088315 A1* | 4/2011 | Donoghue | A01G 25/16 47/48.5 |
| 2011/0106320 A1* | 5/2011 | Hall | A01G 25/16 700/284 |
| 2012/0054125 A1* | 3/2012 | Clifton | G06Q 50/06 705/412 |
| 2012/0084115 A1* | 4/2012 | Cline | A01G 25/16 |
| 2012/0253529 A1* | 10/2012 | Carlson | A01G 25/167 700/284 |
| 2012/0254784 A1* | 10/2012 | Vander Griend | G06Q 50/00 715/771 |
| 2013/0110934 A1* | 5/2013 | Shibuya | H04L 67/1097 709/204 |
| 2013/0132041 A1* | 5/2013 | Sigaty | G06F 17/5004 703/1 |
| 2013/0310992 A1* | 11/2013 | Larsen | A01G 25/16 700/284 |
| 2014/0074734 A1* | 3/2014 | Lassley | G06Q 30/0201 705/306 |
| 2014/0081472 A1* | 3/2014 | Bates | H02J 13/0006 700/286 |
| 2014/0136286 A1* | 5/2014 | Hovis | A01B 69/00 705/7.34 |
| 2014/0236868 A1* | 8/2014 | Cook | A01G 25/16 705/412 |
| 2015/0040473 A1* | 2/2015 | Lankford | A01G 25/16 47/58.1 SC |
| 2015/0147119 A1* | 5/2015 | Christiansen | A01G 25/167 405/37 |
| 2015/0223416 A1* | 8/2015 | Eng | G05B 15/02 700/284 |
| 2015/0366149 A1* | 12/2015 | Canyon | A01G 25/167 700/284 |
| 2016/0057949 A1 | 3/2016 | Williams et al. | |
| 2016/0198644 A1* | 7/2016 | Lameli | A01G 25/16 700/284 |

OTHER PUBLICATIONS

International Search Report and Written Opinion in International Application No. PCT/US2015/047035, dated Feb. 25, 2016, 9 pages.

Non-Final Office Action dated Jul. 26, 2017 of U.S. Appl. No. 14/834,251 by Williams, L. M., et al., filed Aug. 24, 2015.

Notice of Allowance dated Apr. 11, 2018 of U.S. Appl. No. 14/834,251 by Williams, L. M., et al., filed Aug. 24, 2015.

Supplemental Notice of Allowability dated Jun. 22, 2018 of U.S. Appl. No. 14/834,251 by Williams, L. M., et al., filed Aug. 24, 2015.

U.S. Appl. No. 14/834,251 by Williams, L., et al. filed Aug. 24, 2015.

* cited by examiner

ENVIRONMENTAL SERVICES PLATFORM

CROSS-REFERENCE TO RELATED APPLICATION(S)

This application is a continuation of U.S. patent application Ser. No. 14/834,251, titled "ENVIRONMENTAL SERVICES PLATFORM," filed Aug. 24, 2015, which is entitled to the benefit and/or right of priority of U.S. Provisional Application Ser. No. 62/042,765, titled "ENVIRONMENTAL SERVICES PLATFORM," filed Aug. 27, 2014, and U.S. Provisional Application Ser. No. 62/057,908, titled "ENVIRONMENTAL SERVICES PLATFORM," filed Sep. 30, 2014, all of which are hereby incorporated by reference in their entirety for all purposes. This application is therefore entitled to a priority date of Aug. 27, 2014.

TECHNICAL FIELD

The present innovation relates to systems for managing environmental resources such as water and energy at a property. Specifically, it relates to a network-based platform for controlling and managing automated systems, including smart irrigation systems.

BACKGROUND

Effective and efficient resource management is an important issue facing property owners and managers. For example, a properly designed irrigation system should supply enough water to guarantee plant health and keep wasted water at a minimum. This both saves collective water resources and money for the property owner. Multitudes of data are available from a number of sources that may be utilized by property owners and managers to minimize waste. For example, data about the weather at a property may be utilized to calculate irrigation schedules. However, it is not always clear which data is relevant, how to access relevant data, and how to put the relevant data to use in managing resources at a property.

BRIEF DESCRIPTION OF THE DRAWINGS

The present embodiments are illustrated by way of example and are not intended to be limited by the figures of the accompanying drawings. In the drawings.

DETAILED DESCRIPTION

From the foregoing, it will be appreciated that specific embodiments of the innovation have been described herein for purposes of illustration, but that various modifications may be made without deviating from the scope of the innovation. Accordingly, the invention is not limited except as by the appended claims.

System for Implementing an Environmental Services Platform

Figure 1:
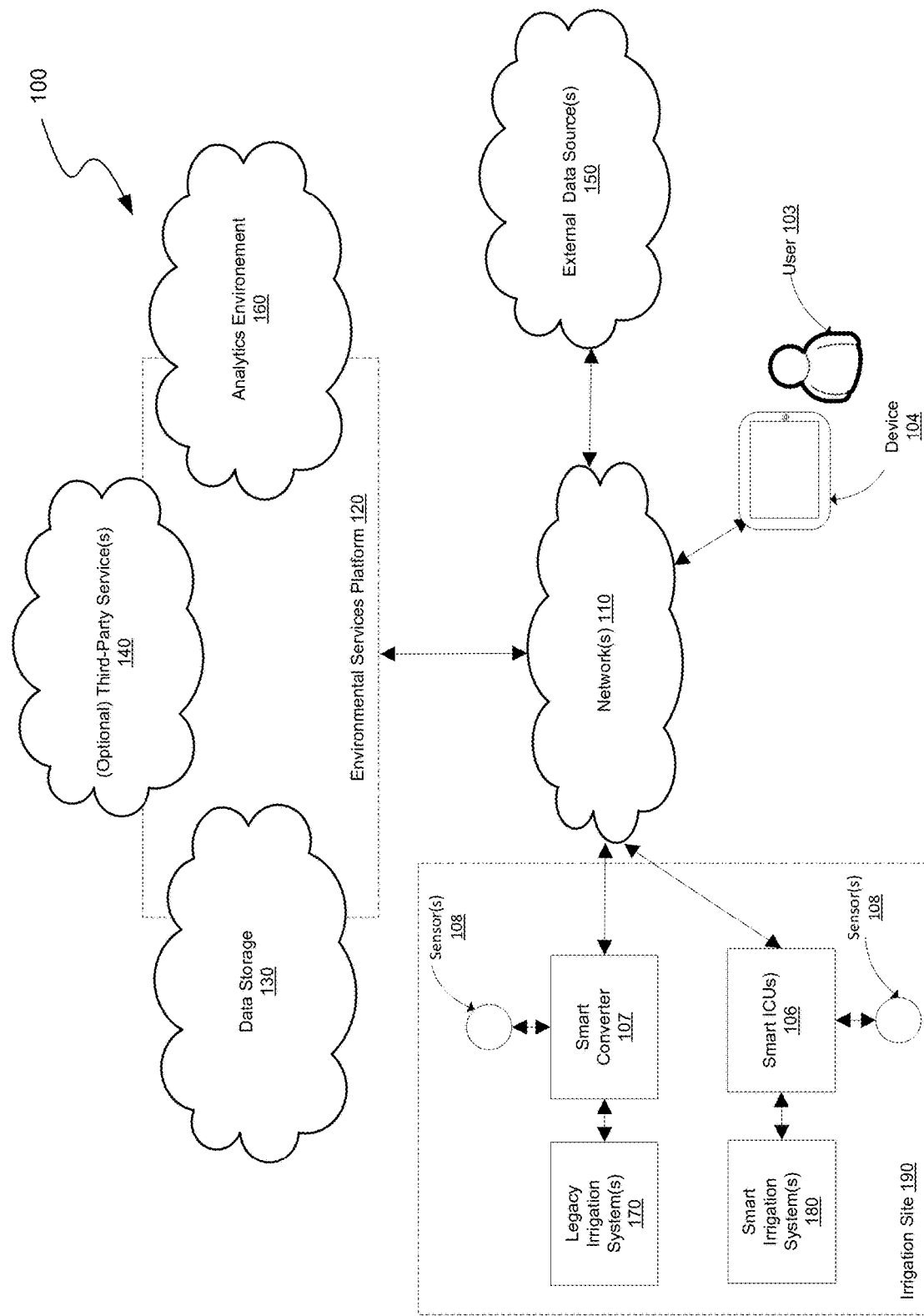
FIG. 1 illustrates an example high-level diagram of a system for implementing an environmental services platform (ESP)

FIG. 1 illustrates an example high-level diagram of a system 100 for implementing an environmental services platform (ESP) according to some embodiments. As shown in FIG. 1, users 103 may access the services provided by an ESP via a computer device 104 connected to one or more networks 110. ESP 120 may comprise one or more cloud-based services and may include data at a data storage 130 and/or external data sources 150, an analytics environment 160 and integration with optional third-party services 140. One or more controllers 106 and sensors 108 may integrate systems 170-180 located at a physical site 190 with the ESP 120.

For illustrative purposes, system 100 is described herein as a system implementing an ESP for smart irrigation control at an irrigation site, for example at irrigation site 190. However, a person having ordinary skill will recognize that the teachings included in the present disclosure may be readily applied to other areas. For example, a services platform similar to ESP 120 may be implemented to provide energy use optimization through network connected building systems (e.g., electrical, HVAC, etc.), or asset management optimization at an enterprise or retail establishment.

Users 103 may, via computer device 104, enter survey data regarding one or more irrigation sites they are managing (e.g., irrigation site 190) which may then be transmitted, via network 110, to ESP 120 where the data may be correlated with other data sources (e.g., local data gathered from sensors at irrigation site 190 and or other third-party data sources). Users 103 may then receive and view an optimized irrigation plan generated at ESP 120 via their computer device 104. Further, users 103 may be presented with a dashboard via their computer device 104 that allows for monitoring and administration of irrigation systems 170-180 at irrigation site 190 via ESP 120. The services available to users 103 via computer devices 104 are described in further detail herein.

Computer devices 104 may include any systems and/or devices, and/or any combination of devices/systems that are able to establish a communication or a connection, including wired, wireless, cellular connections with another device, a server and/or other systems such as the devices and systems of platform 120. Computer devices 104 typically include a display and/or other output functionalities to present information and data exchanged between and among other devices of system 100. It shall be understood that computer devices 104 may comprise any combination of computing hardware and software, for example including hardware components as described with reference to FIG. 7.

For example, the computer devices 104 may include portable devices or non-portable computing devices. For illustrative purposes, computer devices 104 may be any of, but not limited to, a server desktop, a desktop computer, a computer cluster, a notebook, a laptop computer, a handheld computer, a palmtop computer, a mobile phone, a cell phone, a PDA, a smart phone (e.g., iPhone®, etc.), a tablet (e.g., iPad®, etc.), a phablet (e.g., HTC Droid DNA™, etc.), a tablet PC, a thin-client, a hand held console, a smart watch (e.g., Apple Watch™, etc.), a smart glass device (e.g., Google Glass™, etc.) or any other computing device running on any platform or any operating system (e.g., OS X, iOS, Windows Mobile, Android, Blackberry OS, Embedded Linux platforms, Palm OS, Symbian platform, Google Chrome OS, etc.).

The input mechanism on client devices 104 may include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Irrigation site 190 may include one or more legacy irrigation systems 170 or smart irrigation systems 180 with associated site based sensors 108 and irrigation control units 106 connected to network 110. Sensors 108 located at irrigation site 190 may be individually connected to network 110 (e.g., via wired or wireless network connection) or may be integrated with or in some way associated with an ICU 106. In either case, sensors 108 located at irrigation site 190 may be operable to collect current environmental data at irrigation site 190 and transmit the data to the environmental services platform 120 via network 110. Sensors 108 may include, but are not limited to, wind sensors, temperature sensors, barometers for measuring air pressure, hygrometers for measuring humidity, precipitation gauges, pyranometers for measuring solar radiation, and any other sensors configured to sense characteristics of the surrounding environment. For example, according to some embodiments, a sensor 108 may be a local automated weather station (AWS).

Smart irrigation system 180 may include or be connected to a smart ICU 106, according to some embodiments. Here a smart irrigation system 180 may include the watering stations distributed around the irrigation site. A smart ICU 106 may be configured to receive irrigation schedules and/or direct control signals from the ESP 120 via network 110. According to some embodiments, the irrigation schedules may include sets of valve commands that may control one or more watering stations associated with smart irrigation system 180 by actuating the valves at the stations at predetermined times. ICU 106 may further be configured to transmit data from the site to ESP 120. For example, data gathered by sensors 108 or data gathered by system monitoring sensors associated with smart irrigation system 180, for example, sensors configured to detect faults or leaks at the watering stations. According to some embodiments, an ICU 106 may include a signal interface, a power interface, a memory, a processor, a data transceiver, a display, a user control, and a power storage. Further, according to some embodiments, ICU 106 may include all or some of the components described with reference to FIG. 7. An example smart irrigation system similar to smart irrigation system 180 and associated ICU 106 is described in more detail in U.S. Pat. No. 7,596,429, titled "IRRIGATION SYSTEM," filed on Dec. 10, 2003, issued to Cardinal et al. on Sep. 29, 2009, the entirety of which is hereby incorporated by reference for all purposes.

Legacy irrigation systems 170 may be "dumb" timer-based irrigations systems that include simple controllers that may automatically control one or more watering stations based on a modifiable yet fixed schedule. Legacy irrigation systems 170 may be connected to a network and make use of the services provided by an ESP 120 using a smart converter 107. Accordingly, a smart converter 107 may be operable to convert a legacy timer-based irrigation system into a smart irrigation system similar to smart irrigation system 180 with associated ICU 106. Like ICUs 106, smart converters 107 may be configured to receive irrigation schedules and/or direct control signals from ESP 120 via network 110. Also like ICUs 106, smart converters 107 may be configured to transmit data (e.g., data gathered by sensors 108 or data gathered by system monitoring sensors associated with smart irrigation system 170) to ESP 120 via network 110. According to some embodiments, a smart converter 107 may include a signal interface, a power interface, a memory, a processor, a data transceiver, a display, a user control, and a power storage. Further, according to some embodiments, smart converter 107 may include all or some of the components described with reference to FIG. 7. An example smart converter 107 (also referred to as a smart scheduler) is described in more detail in U.S. patent application Ser. No. 13/301,679 by Halahan et al., entitled "System and Method for Smart Irrigation" filed Nov. 21, 2001, now issued as U.S. Pat. No. 8,948,921, the entirety of which is hereby incorporated by reference for all purposes.

FIG. 1 provides a high-level conceptual diagram of an example ESP 120. It shall be understood that ESP 120 may be composed of any combination of computing hardware and software, for example including hardware components as described with reference to FIG. 7. Further, it shall be understood that ESP 120 may include components hosted at a single physical location or may include components distributed at multiple physical locations in communication with each other via, for example, network 110. It shall also be understood that ESP 120 may include fewer or more components than as shown in FIG. 1. For example, FIG. 1 illustrates an embodiment of the present disclosure in which cloud storage services and analytics are provided by third-party systems (e.g., Amazon AWS™ and Google BigQuery™). According to some embodiments, functionality provided by such services may be provided by a provider of ESP 120 without reliance on third-party services. Users 103 may access the functionality of ESP 120 via network 110 a number of ways, including, but no limited to via client software instantiated on a computer device 104, or via a web browser instantiated on computer device 104. In either case, access to the functionality of ESP 120 may be provided via a graphical interface presented to users 103 at computer device 104.

ESP 120 represents a cloud-based services platform through which the systems and methods described herein may be provided to users 103. According to some embodiments, ESP 120 may provide one or more cloud-based services (some provided by third-parties) via one or more services engines. For example, ESP 120 may include a plurality of services engines through which the functionalities described herein may be provided, including but not limited to, mapping/location engines, survey engines, search engines, data correlation/analytics engines, database engines, workflow processing engines, cluster resource management engines, network engines, weather prediction engines, plant optimization engines, products/services recommendation engines, and irrigation scheduling engines.

As previously mentioned ESP 120 may include data storage 130 where data is stored and processed. Data stored on data storage 130 may be stored in raw form and/or in one or more databases, data stores, data warehouses, or any other data structure types. Data storage 130 may be hosted on one or more physical server machines at a single physical data center location; however, as shown in FIG. 1, data storage 130 may be hosted on multiple physical server machines in a distributed manner in the "cloud." Hosting of data storage 130 may be provided by the ESP provider or may be provided by a third-party cloud storage provider. For example, Amazon Web Services™ offers a simple remote cloud storage service called Amazon S3™.

Data storage 130 may represent the aggregation point or staging area for the multiple data sources utilized in system 100, including but not limited to, user input data provided through the survey process, sensor data from sensors 108 and data from third-party sources 150. Data may be pushed or pulled from the source and stored for operational use at data storage 130. It will be appreciated that such an implementation may require relatively high levels of storage capacity. Alternatively, metadata associated with the multiple source data may be stored in a key store database for quick access from the sources when needed.

Data in data storage 130 may be stored as one or more databases, data stores, data warehouses, and/or any other data structures configured to allow for the efficient definition, creation, querying, update, and administration of data. For example, according to some embodiments, data storage 130 may include databases employing a relational database architecture. Examples of relational database management systems include MySQL, Oracle Database, Microsoft SQL Server, and IBM DB2. Alternatively, data storage 130 may include databases employing a means of storage and retrieval other than the tabular relations used in relational databases. For example, data storage 130 may include NoSQL based databases that as described above may be implemented as key store databases. A NoSQL key store database storing associative array of metadata representing the source data may be preferable in this context due to the high performance and scalability which may be needed to deal with near-real time processing of queries on large-scale data sets. Examples of NoSQL databases suitable for implementation with ESP 120 include, but are not limited to, MongoDB, HBase, Cassandra, and Couch DB.

According to some embodiments, data storage 130 may implement a distributed file system for the storage, retrieval and processing of data. For example, Apache Hadoop Distributed File System (HDFS) is a file system in the Apache Hadoop framework that has the capability of storing and processing large-scale data sets across multiple machines. HDFS achieves reliability by replicating the data across multiple host data nodes. Data nodes can talk to each other to rebalance data, to move copies around, and to keep the replication of data high. Data stored in an HDFS may be accessed via an application programming interface (API) (e.g., the Java API).

ESP 120 may include one or more job engines configured to process data via a cluster of computing devices implementing a distributed file system. For example, an HDFS may employ a MapReduce engine to which client applications (e.g., applications 240-260 referenced in FIG. 2) may submit MapReduce jobs as part of a task to be performed by the distributed computing cluster. MapReduce generally describes a programming model for processing large-scale data sets across multiple computing nodes that comprises two steps: a map step and a reduce step. At the map step, a cluster controller may intake a problem or query associated with a large-scale data set and divide the problem or query amongst the multiple computing nodes of the cluster. The multiple computing nodes may process the data and return the answer to the cluster controller. At the reduce step the cluster controller may collect the answers from the multiple nodes and combine into a single output.

ESP 120 may also include a large-scale data analytics environment 160 through which data stored at data store 130 may be analyzed. According to some embodiments, analytics environment 160 may be cloud-based and include data storage and one or more query/analytics engines. According to some embodiments, analytics environment 160 may be provided by the ESP 120 provider. Alternatively, the analytics environment 160 may be provided by a third-party as a service such as Google BigQuery™ and Amazon Redshift™.

Third-Party Services 140 may include services offered by remote third-party providers that add additional functionality to ESP 120. For example, as already discussed cloud storage hosting and/or analytics may be provided by a third-party as a service forming part of the functionality of ESP 120. Similarly, other services may be integrated, for example, through an application programming interfaces (API). Examples of other services that may be hosted by third parties include, but are not limited to, advertising services, retail services, content delivery, location services, mapping services, third-party irrigation system providers, etc.

External data sources 150 may include available data from third-party providers that may be correlated with input data provided by users 103 and sensor data from sensors 108 to optimize irrigation schedules and provided planting recommendations. External data sources 150 may include, but are not limited to, soil data (e.g., soil survey data collected by UC Davis Soil Research Lab), plant data (e.g., the Plant List, which includes over 1 million plant listings), current weather data (e.g., from Accuweather™) historical and forecast weather data (e.g., from Forecast.io), solar radiation data (e.g., from Vaisala), and geographic data (e.g., from numerous GIS sources). It will be understood that data such as soil data, geographic data, plant data, and any other data relating to the physical characteristics of the site may be broadly categorized as "landscape data." Similarly, weather data, climate data, solar radiation data, and any other data relating to the environment surrounding the site may be broadly categorized as "environmental data."

The aforementioned computing devices, including computer devices 104 and any computing devices associated with ESP 120, data storage 130, third-party services 140, analytics environment 160, external data sources 150, and irrigation systems at irrigation site 190 may be connected to each other through one or more wired and/or wireless networks, for example network 110.

In general, network 110 may include any collection of distinct data networks operating wholly or partially in conjunction to provide connectivity for the computing devices associated with the system components shown in FIG. 1. Distinct network types, may include, but are not limited to, one or more of, a Local Area Network (LAN), a Wide area network (WAN), a Personal area network (PAN), a Campus area network (CAN), a Metropolitan area network (MAN). Further, connectivity may be achieved wirelessly over any wireless network type, including but not limited to, one or more of, a Wireless Local Area Network (WLAN), or Wireless wide area network (WWAN). Communication over any of the previously listed network types may be enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, and messaging protocols such as, TCP/IP, SMS, MMS, extensible messaging and presence protocol (XMPP), real time messaging protocol (RTMP), instant messaging and presence protocol (IMPP), instant messaging, USSD, and IRC.

In some embodiments, communications can be secured using a secure communications protocol, such as secure sockets layer (SSL), or transport layer security (TLS).

Architecture and Process for Implementing an Environmental Services Platform

Figure 2:
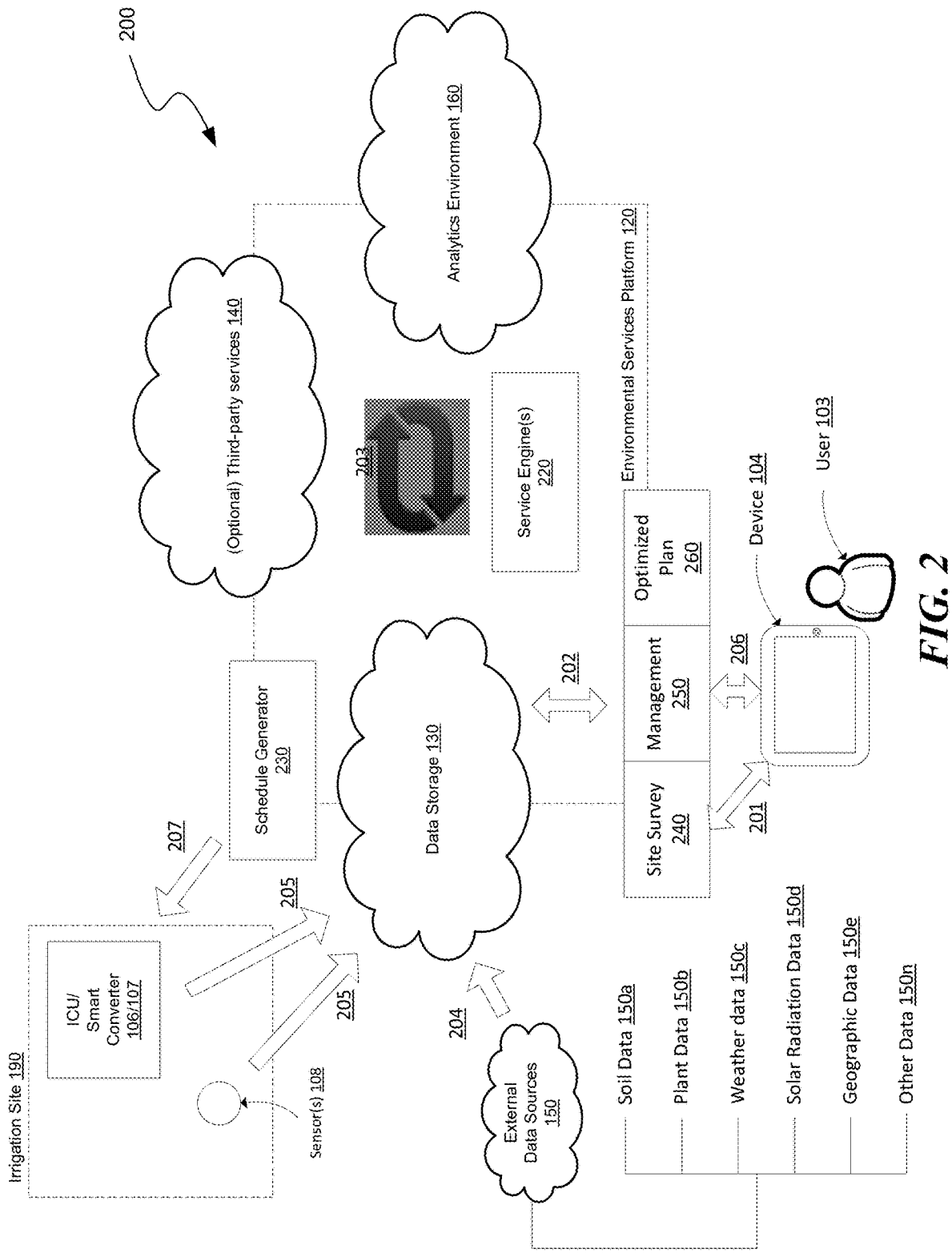
FIG. 2 illustrates a high-level diagram of an example architecture and process flows for providing services associated with an ESP.

FIG. 2 illustrates a high-level diagram of an example architecture 200 and process flows for providing services associated with an environmental services platform 120. The architecture 200 and process flow may involve components of system as referenced in FIG. 1 and represents and alternative conceptualization of similar teachings.

As shown in FIG. 2, at step 201 a user 103 enters information in the form of initial site survey data regarding the physical site to be irrigated (e.g., irrigation site 190) via a user interface presented via device 104. As a non-limiting example for illustrative purposes, user 103 may be a facilities manager for a business, or an individual property owner. In some embodiments, information is entered via a survey application 240 instantiated at device 104. Alternatively, application 240 may be web-based with data input via a web-based interface at a browser instantiated at device 104. Interface 300a may be presented via a display of device 104.

Figure 3A:
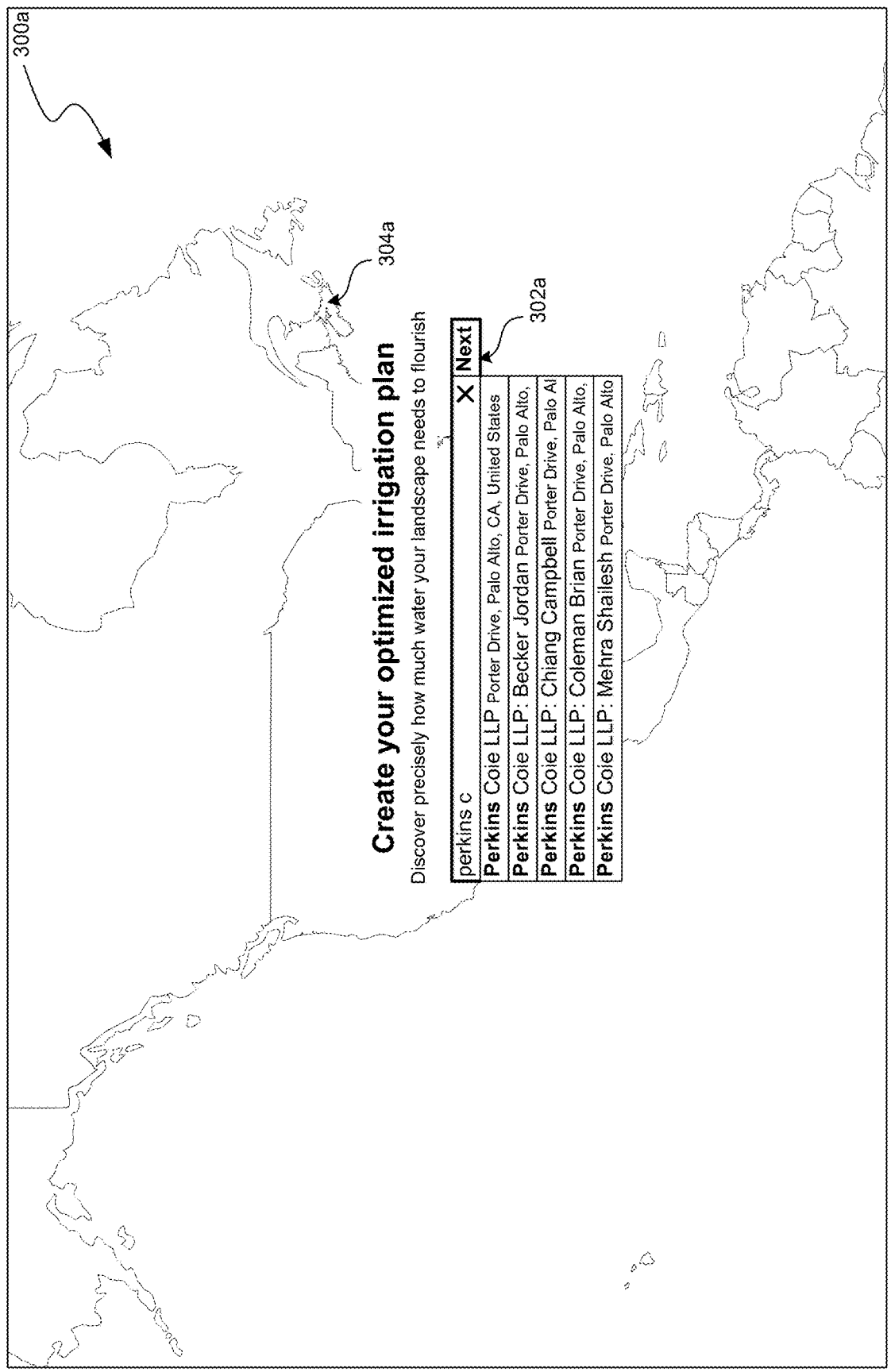
FIG. 3A-3G depict screen captures of an example site survey entry interface.

FIG. 3A depicts a screen capture of an example survey entry interface 300a representing the initial screen that user 103 may be presented with, according to some embodiments. Here, user 103 may be prompted to enter an address for their irrigation site at editable field 302a. Alternatively, user 103 may simply zoom in on map 304a to find and select a specific area or parcel of land on the map. Application 240 may incorporate one or more services from platform service engines 220. For example, service engines 220 may incorporate a map engine. Further, the map engine functionality provided through service engines 220 may be supplied through one or more third-party services 140, for example via a Google Maps™ API.

Returning to FIG. 2, initial site data (e.g., the address of irrigation site 190) may at step 202 be transmitted to ESP 120 (e.g., via network 110 as shown in FIG. 1) where it may be correlated with other data relevant to the selected site at processing queue 203. In some embodiments, this process of correlating the data may be performed in in real time or near real-time to when the data is received. Data storage 130 may include key store metadata on other data relevant to irrigation site 190, for example, soil data 150a, plant data 150b, weather data 150c, solar radiation data 150d, geographic data 150e, and any other data 150n. Some of this data may be stored at data storage 130 and some may be stored at third-party data sources 150. According to some embodiments, data from external sources 150 may be either pushed or pulled from those sources at regular or irregular intervals. For example, data (or metadata associated with data stored at sources 150) may be pulled at regular intervals (e.g., once every 15 mins) and stored at data storage 130 such that data storage 130 remains relatively up to date at any time. Alternatively, data may be pulled from external sources as needed when a query arises. For example, data storage 130 may include a simple key store with data representing sources to query for a particular address. If a user 103 enters that address ESP 120 may pull data from external sources 150 as-needed based on that query. Based on the correlation of data during processing queue 203, ESP 120 may at step 202 return data relevant to site 190.

Figure 3B:
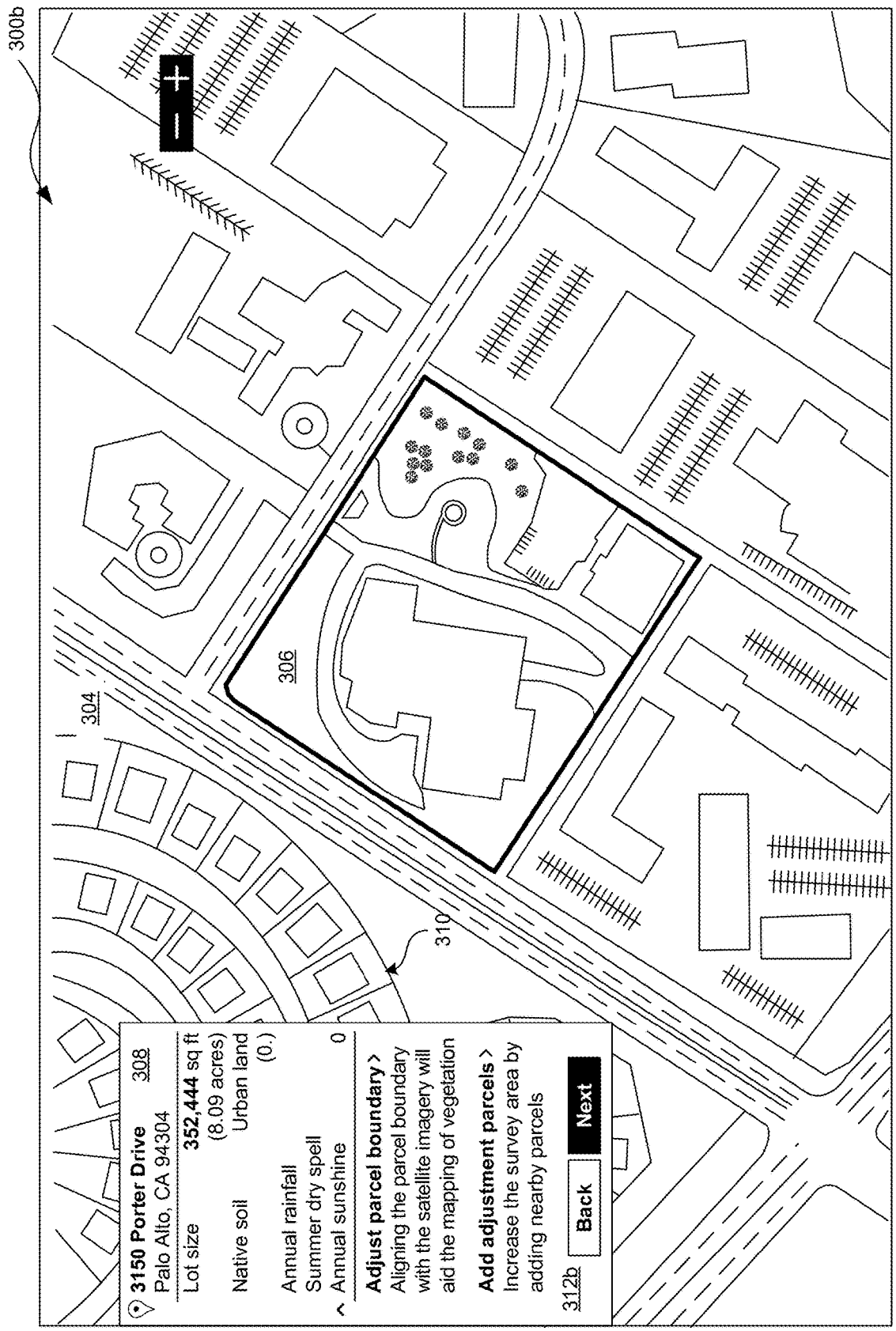

FIG. 3B depicts a screen capture of an example survey entry interface 300b representing the second screen that user 103 may be presented with in response to their entering an address via interface 300a as depicted in FIG. 3A. Here, interface 300b may include map 304 zoomed in to show parcel 306 (e.g., irrigation site 190 from FIGS. 1-2). According to some embodiments, map 304 may be a satellite image and may include outlines of a number of different parcels (e.g., parcel 310) included in the area around parcel 306. According to some embodiments, data regarding parcel boundaries may be provided by an external data source 150 such as a county records office online database. Here, parcel 306 may be highlighted to direct the user's 103 attention to the selected parcel. Interface 300b may also include information 308 regarding site 306 based on the correlation and/or analysis performed at ESP 120 at step 203. For example, as depicted in FIG. 3B, ESP 120 may automatically return the lot size of the selected parcel, the native soil(s) present at the selected parcel, historical weather data such as annual rainfall, summer dry spells, and annual sunshine. Other information not shown in FIG. 3B may also be presented, including but not limited to, shade coverage, topographical information, plant information, etc. As mentioned earlier data included in information 308 may be from a number of different external data sources 150a-n referenced in FIG. 2. Further, information 308 may include data regarding any existing irrigation systems located within parcel 306 (e.g., systems 170-180, smart converters/ICUs 106-107, and sensors 108) if such systems exist and if that data is available. For example, parcel 306, as depicted in interface 300b, may include the locations of devices associated with such systems and information (e.g., type, status, etc.) associated with each device. Further still, information 308 may include data gathered by local systems (e.g., sensors 108) which may provide hyper-local environmental data. For example, the information 308 may automatically present the current temperature at parcel 306 and a chart of temperature highs/lows at parcel 306 over the past week.

It shall be appreciated that information 308 represents one example embodiment of how data may be presented to the user via interface 300b. Alternatively, data may be presented graphically. For example, shade coverage may be presented as a graphical overlay over map 304, which according to some embodiments, may be interactive. A user may provide an input (e.g., through a swiping gesture) to view how the shade coverage changes at site 306 over the course of the day at different times of year.

Interface 300b may also include options 312b to adjust the parcel selected based on the address entered at interface 300a in FIG. 3A. For example, as shown, options may be provided to user 103 to adjust the boundary of the selected parcel as shown or to add adjacent parcels.

Figure 3C:
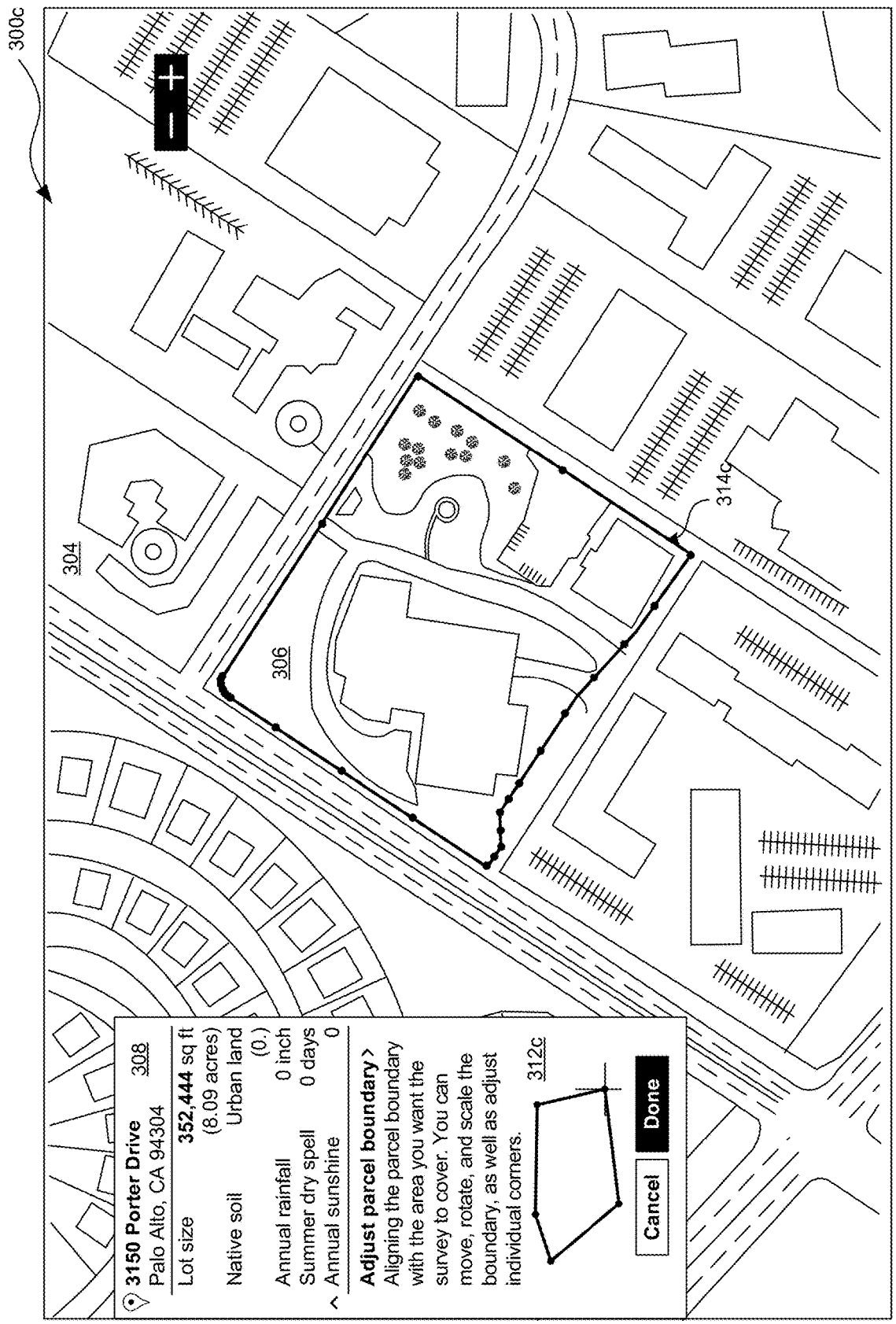

If user 103 elects to adjust the parcel boundary they may be presented with interface 300c as depicted in FIG. 3C. Interface 300c may include an adjustable overlay outline 314c enabling user 103 to adjust the boundaries of parcel 306. It shall be appreciated that depiction in FIG. 3C of adjustable overlay 314c is provided as an example, for illustrative purposes and is not to be construed as limiting. User 103 may adjust the boundaries of parcel 302c in a number of different ways while remaining within the scope of the present teachings, including but not limited to providing an input via an input device such as a mouse or a touch screen display. For example, user 103 may adjust the boundaries of parcel 306 by selecting and dragging one or more anchor points or nodes associated with the boundary overlay 314c, as shown in FIG. 3C.

Figure 3D:
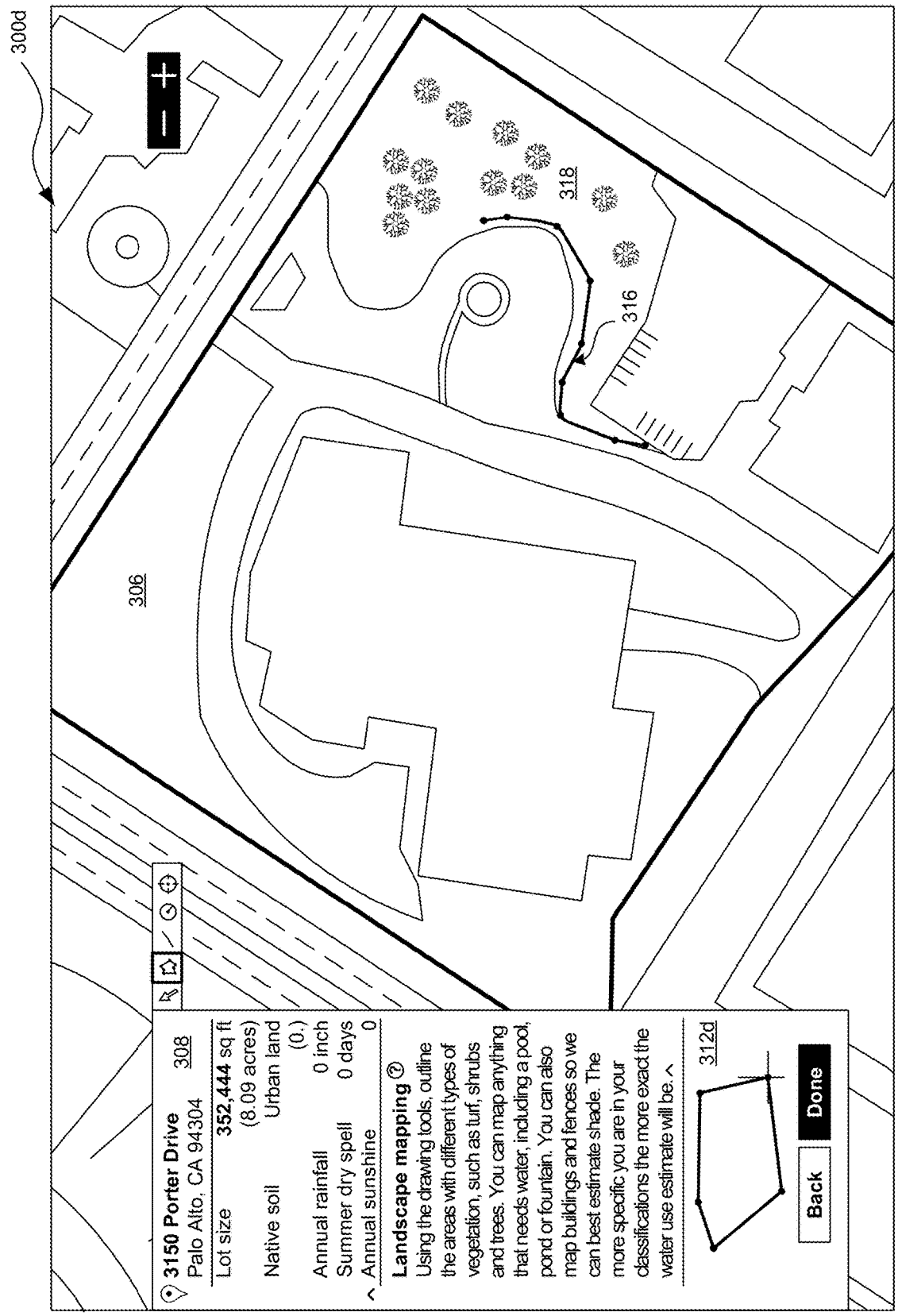

Having adjusted the boundaries of the selected parcel 306, user 103 may be presented with interface 300*d* as depicted in FIG. 3D. Interface 300*d* may include options 312*d* to map the landscape to be irrigated within parcel 306. As shown, a user 103 may outline areas of landscape 318 with an interactive tool 316.

User 103 may adjust the boundaries of landscape area 318 in a number of different ways while remaining within the scope of the present teachings, including but not limited to providing an input via an input device such as a mouse or a touch screen display. For example, user 103 may use interactive tool 316 to adjust the boundaries of parcel 306 by selecting and dragging one or more anchor points or nodes associated with the boundary overlay 314*c*, as shown in FIG. 3C.

Figure 3E:
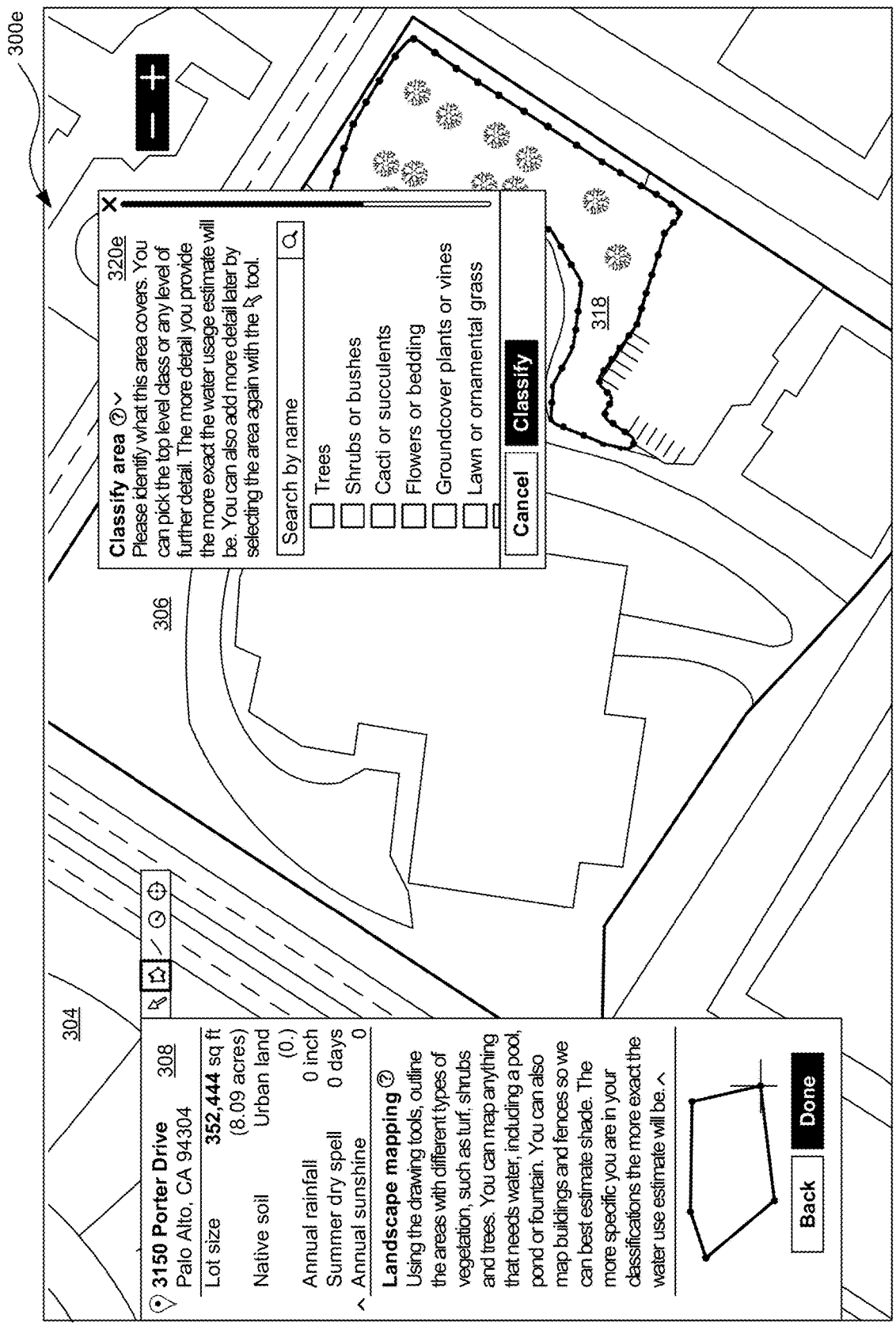

Once user 103 has defined one or more landscape areas 318, they may be presented with interface 300*e* as depicted in FIG. 3E. Interface 300*e* may include options 320*e* to classify the selected one or more landscape areas 318. As shown in FIG. 3E, classification options 320*e* may include a list of categories of plans, including but not limited to, trees, shrubs/bushes, cacti and other succulents, flowers, groundcover plants/vines, and lawn grass. Further, user 103 may select a classification option (e.g., grass) and be presented with options to select sub-classifications (e.g., Kentucky Bluegrass). According to some embodiments, user 103 may also enter the name of a plant or classification of plants into an editable text field. Options 320*e* selected by user 103 may represent the existing plant cover at landscape 318, plans for future plant coverage or any combination thereof. According to some embodiments, plant data may be automatically prepopulated in landscape 318 if that data is available through an external source 150 (e.g., a prior performed plant survey).

Figure 3F:
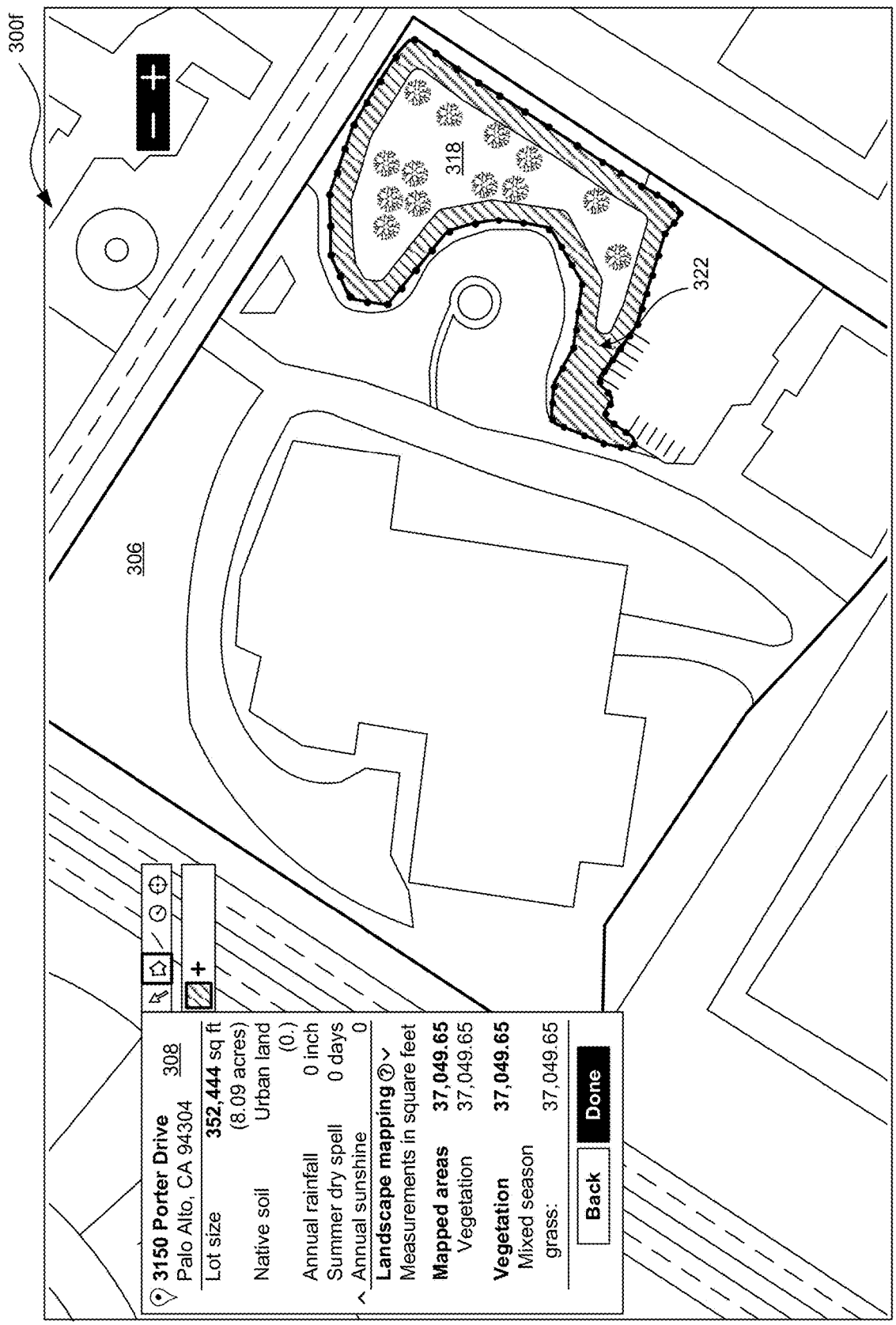

Once user 103 has classified the vegetation in landscape area 318 they may be presented with an interface 300*f* as depicted in FIG. 3F. As shown in FIG. 3F, landscape area 318 may include a graphical overlay 322 indicating to user 103 that the area has been classified and the type of vegetation comprising that classification.

Figure 3G:
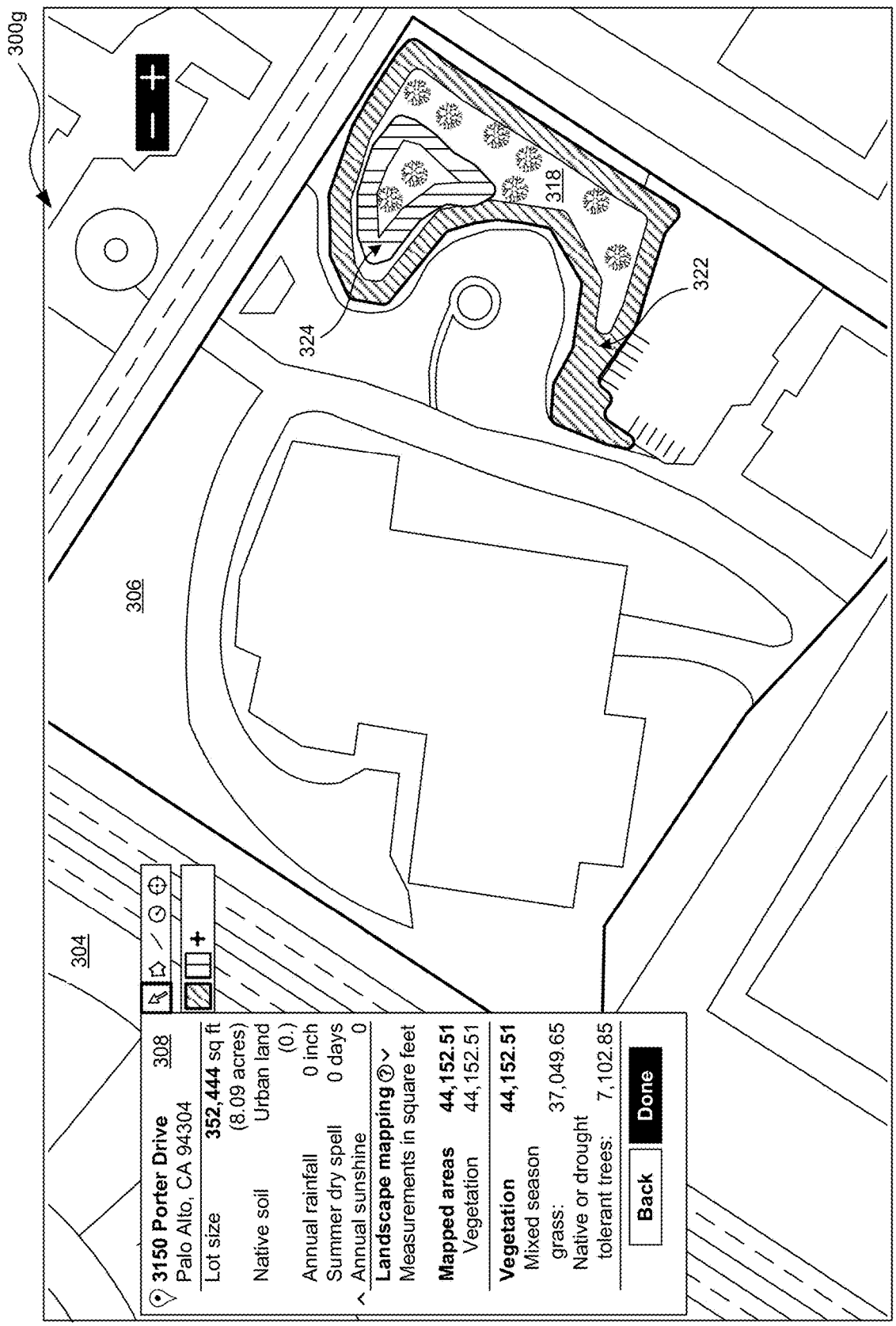

According to some embodiments, user 103 may classify multiple landscape areas within the same parcel. For example, as illustrated in interface 300*g* shown in FIG. 3G, a user 103 may classify a landscape 324 within landscape 318. As an illustrative example, here landscape 324 may be classified as evergreen trees while landscape 318 may be classified as Kentucky bluegrass. Landscape areas with different classifications may be presented to user 103 with different graphical indicators as shown in FIG. 3G.

Returning to FIG. 2, the landscape data provided by user 103 via the site survey process (described with respect to FIGS. 3A-3G) may be transmitted at step 202 to ESP 120 where it may be analyzed and/or correlated in real time or near real-time with other data relevant to the selected site at processing queue 203. As previously described, relevant data may include data from third-party sources 150 (e.g., soil data 150*a*, plant data 150*b*, weather data 150*c*, solar radiation data 150*d*, geographic data 150*e*, and any other data 150*n*) as well as real time or near-real time data collected at the selected site via sensors 108 (if already installed) and/or other irrigation system components (e.g., and ICU 106 or converter 106). As shown in FIG. 2, data from sources at the selected irrigation site may be pushed or pulled at step 205 to ESP 120. According to some embodiments, data may be pushed or pulled at regular (e.g., every 15 mins) or irregular intervals. According to some embodiments, data may be pushed or pulled at step 205 on an as-needed basis. For example, if regional weather data from an external weather source 150*c* indicates high variation in weather patterns in the area, ESP 120 may pull weather data from sensors 108 at site 190 on regular shortened intervals.

In response to analysis and correlation of data relevant to a selected site ESP 120 may provide several functionalities to user 103.

Optimized Irrigation Plan

According to some embodiments, ESP 120 may generate an optimized irrigation plan for user 103, viewable via device 104. According to some embodiments, an optimized irrigation plan may be presented to user 103 via an application 260 instantiated at device 104. Alternatively, application 260 may be cloud-based with access provided via a web-based interface at a browser instantiated at device 104. Also, a person having ordinary skill will recognize that, according to some embodiments, applications 260 and 240 may be part of the same software application.

The optimized irrigation plan may generally be described as a set of information or suggestions based on analysis of historical, current, and predicted data form multiple sources regarding a potential irrigation site that may be useful to user 103 in planning the irrigation of the site.

Figure 4A:
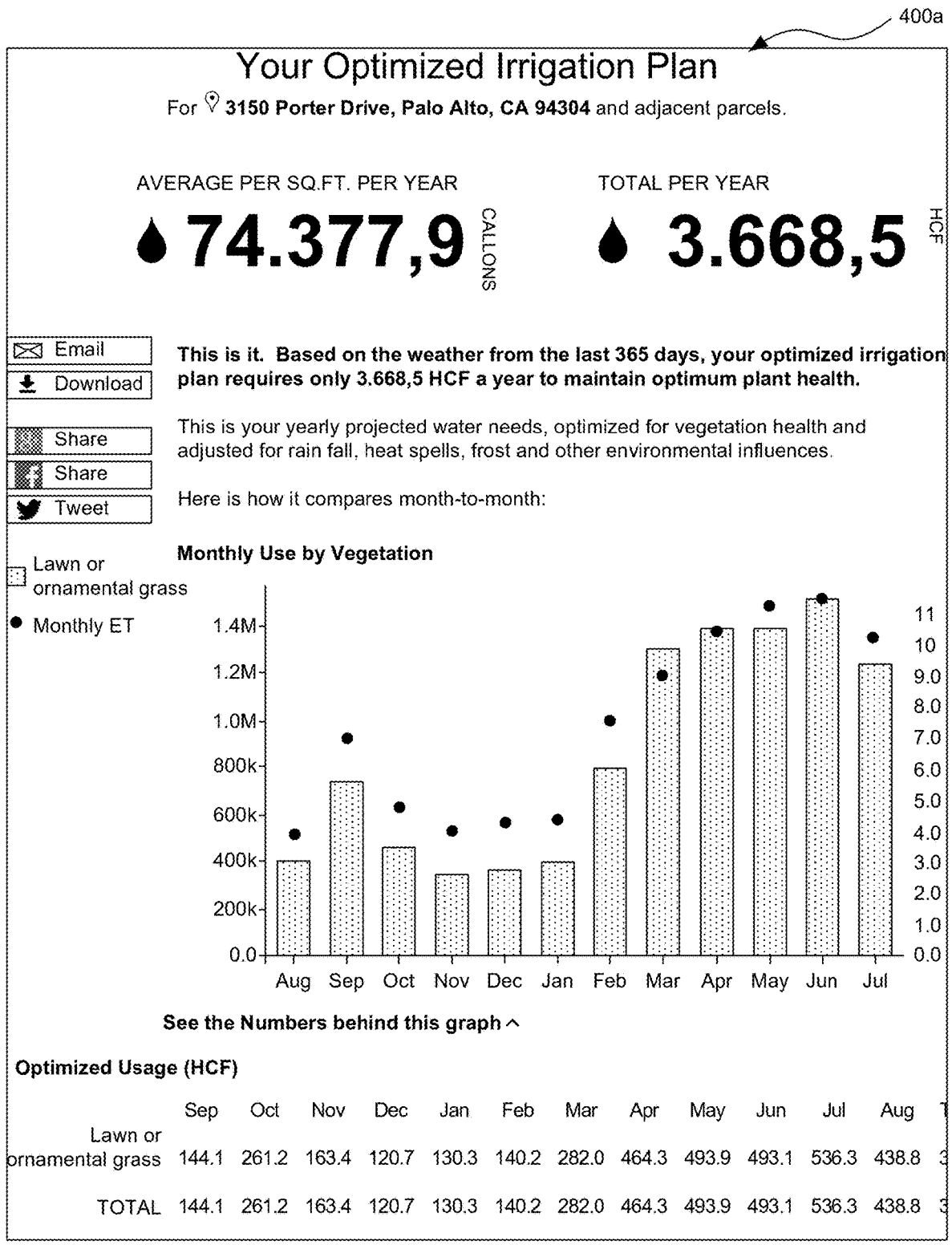
FIG. 4A-4C depict screen captures of example outputs of an optimized irrigation plan.
Figure 4B:
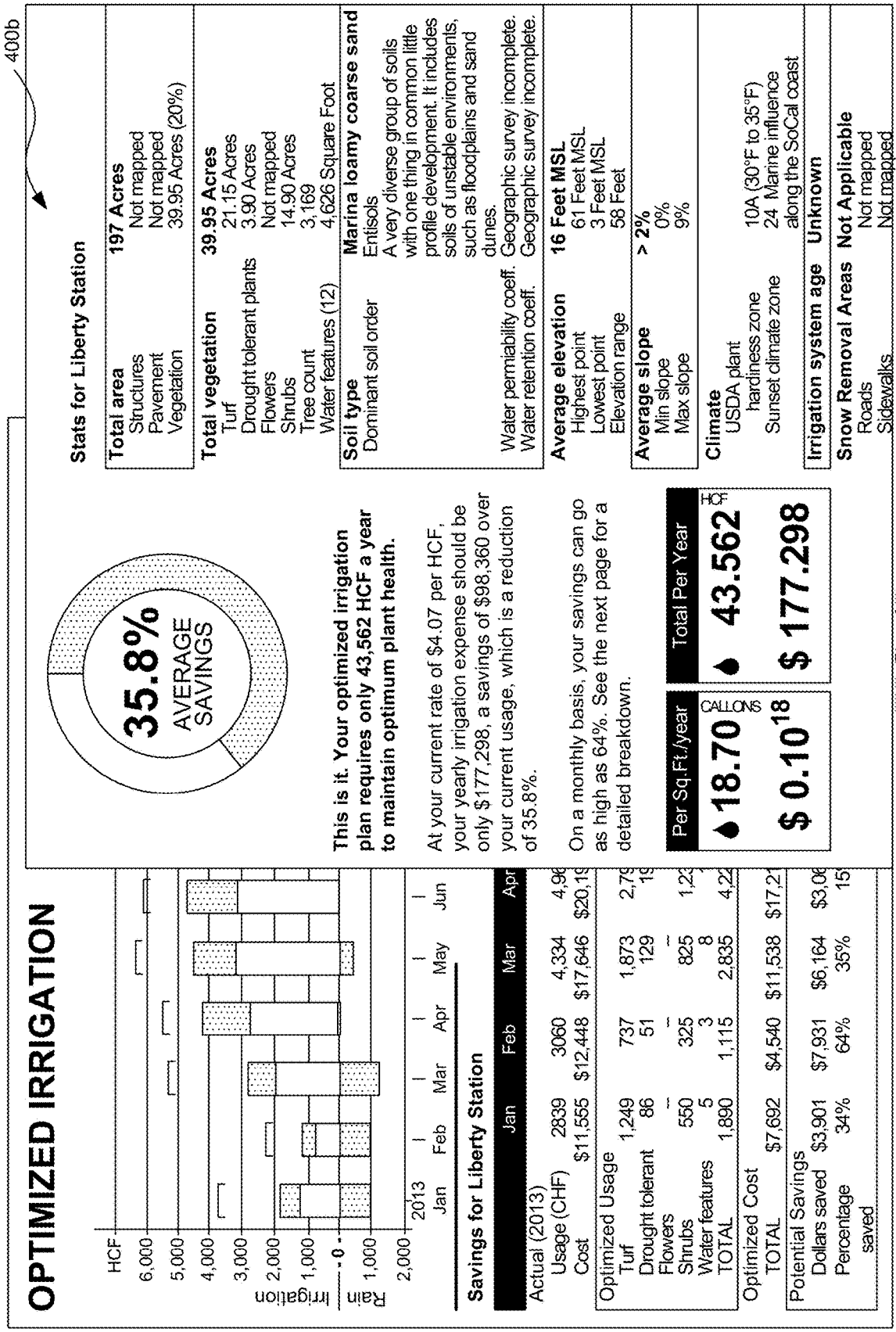
Figure 4C:
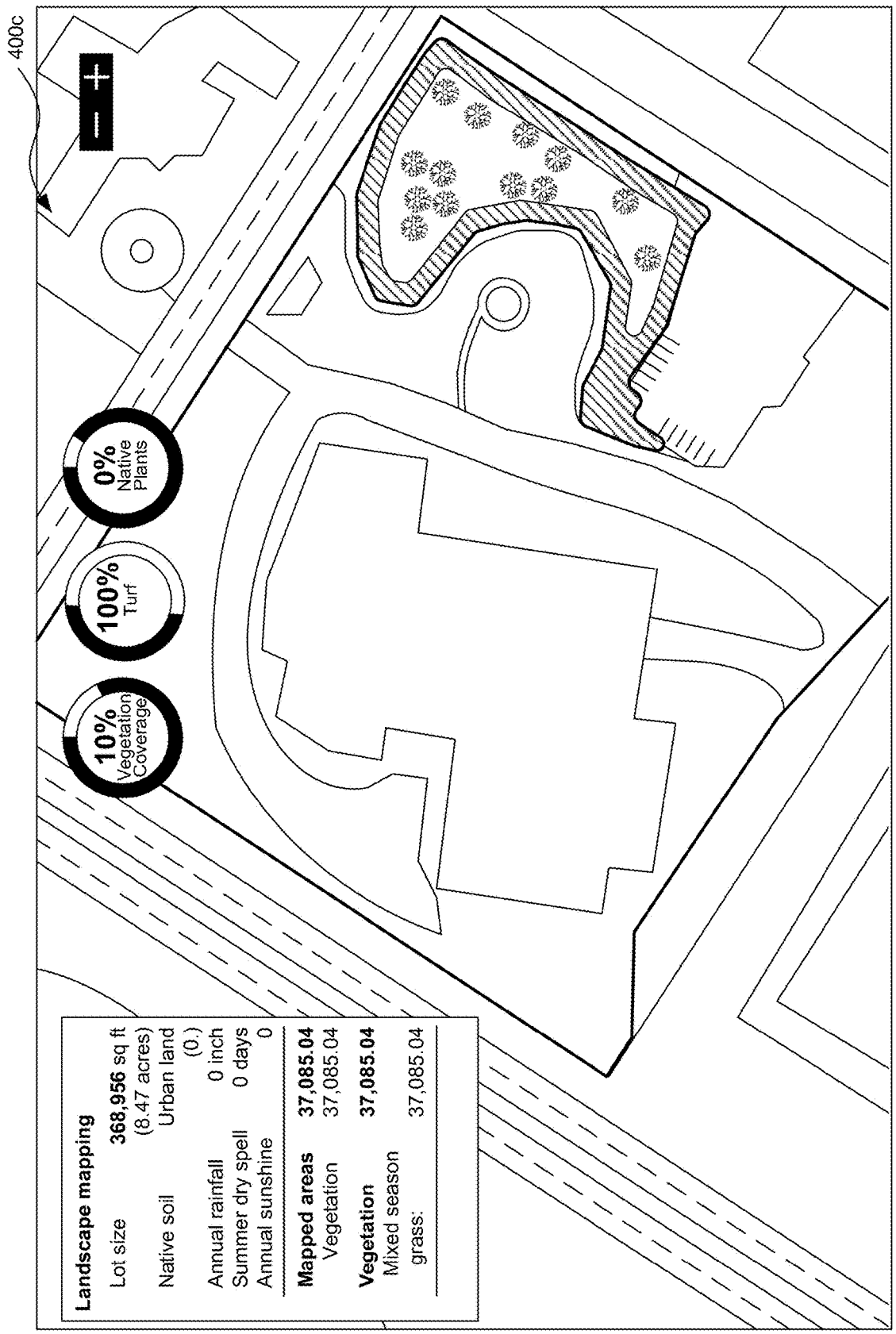

FIGS. 4A-4C depict screen captures of example outputs for optimized irrigation plans, according to some embodiments. As shown in FIG. 4A, an optimized irrigation plan may include information regarding predicted water use and as well as how that water use is distributed through the year and per plant types. For example, here, based on the survey information provided by user 103 at step 201 (with reference to FIGS. 2 and 3A-3G), the optimized irrigation plan 400*a* includes a predicted water usage of approximately 74,377 gallons of water per square foot per year or approximately 3,668 HCF (hundred cubic feet) of total water usage over the course of the year. This information may represent minimal predicted water usage over the course of the year based on predicted evapotranspiration or hyper-local evapotranspiration at the site, among other factors. Generally stated, evapotranspiration or "ET" is the sum of water evaporation from the ground and water transpiration from plants to the atmosphere. ET is an important component in determining the water needs for plants and is based on a number of factors including landscape characteristics, weather (including solar radiation) and plant-specific characteristics. Additional information regarding ET is included in the section titled, "Plant-Specific Hyper-Local Evapotranspiration." Further, as shown in FIG. 4A, the optimized irrigation plan may include information broken up by month and/or by plant type. Here, a chart of predicted water requirements based on calculated ET is presented as a chart over the course of one year. This may clearly convey to user 103 the increased watering requirements for the selected area that experiences a very sunny dry summer. Although FIG. 4A shown only watering requirements for the lawn grass, this chart may show water use per plant type which may reveal to user 103 plant types that may exhibit relatively high watering requirements.

According to some embodiments, the optimized irrigation plan may include social network integration, for example, through providing options to share the generated optimized irrigation plan through third-party social network platforms (e.g., Facebook™ or Twitter™).

FIG. 4B depicts another example optimized irrigation plan 400*b*, according to some embodiments. In addition to predicted water requirements based on calculated ET, an optimized irrigation plan 400*b* may include more detailed statistics for the selected site (again based on multiple sources of data—e.g., data from sources 150 or sensors 108). Additional statistics data may include, but is not limited to, plant data, soil type, landscape data such as slope and elevation, weather data, and data about installed irrigation systems. Further, optimized irrigation plan 400b may include cost savings data indicating a predicted savings water costs to user 103, based on preset assumptions, that may be realized by adopting the optimized irrigation plan.

FIG. 4C depicts yet another example optimized irrigation plan 400c, according to some embodiments. As shown, an optimized irrigation plan 400c may include a landscape map of the selected site with statistical data regarding plant coverage (e.g., percentage of the parcel covered by native plants).

Optimized irrigation plans generated by ESP 120 may include additional information not shown in FIGS. 4A-4C. According to some embodiments, an optimized irrigation plan may include recommendations as to plant coverage (herein referred to as "optimum plant factors"). For example, after user 103 has gone through the survey process and defined the plant coverage as it currently exists or is planned, ESP 120 may return suggestions for altering the existing or planned plant coverage. Consider an example where during the survey process, user 103 specifies grass variety A for a particular planting area in the selected parcel. In response to the user's defined planting area an analysis may be performed at ESP 120 taking into account the defined planting area and all of the other data that may be available regarding the selected site (e.g., light coverage/shade, soil, existing and planned plant types, weather, landscape slope, etc.). For example, based on cross-correlation of shade data, ESP 120 may determine that the particular planting area is in shade 70% of the day during peak daylight months and that grass variety A requires greater amounts of sunlight, while grass variety B does not require as much sunlight. As another example, based on cross-correlation of existing soil data, ESP 120 may determine that the selected planting area contains a soil type that is not conducive to growing grass variety A but that is very good for growing grass variety B. As another example, based on cross-correlation of existing plant data, ESP 120 may determine that the selected planting area runs adjacent to a grove of trees that may incompatible with grass variety A.

Based on the analysis and cross-correlation of data, ESP 120 may make certain recommendations for adjustments to the planting plan, for example using a recommendation engine with preset algorithms or dynamic algorithms incorporating machine learning. According to some embodiments, a recommendation engine may be one of several service engines 220 as shown in FIG. 2. An optimum plant factors recommendation engine may make a number of recommendations to user 103 including but not limited to, alternative plant varieties, additional products or services to implement (e.g., upgraded irrigation systems and/or referrals to local landscaping professionals), alternative landscaping layouts, and changes to the soil. It shall be appreciated that optimum plant factor recommendations may be presented in a number of different ways including, but not limited to, text-based suggestions, and/or re-drawn landscaping maps showing an optimal plant selection and layout. Further, optimum plant factor recommendations may include information providing an incentive to follow the recommendations. For example, a recommendation may include data informing user 103 of how much water (and by consequence how much money) they may save by following the optimum plant factor recommendations. According to some embodiments, the recommendation engine may be calibrated through certain user preferences or selections. For example, a user 103 may wish to plant yellow roses in their yard. Based on analysis performed, a recommendation engine (at ESP 120) may determine that yellow roses do not present the optimal plant variety based on all other site factors. However, if the user 103 has set a preference stating they want to plant yellow roses no matter what, the recommendation engine may recommend actions (other than choosing a different flower to plant) that user 103 may take to optimize their water consumption in their yard. For example, the recommendation engine may suggest certain trees to provide shade coverage for the roses so that they do not require as much water to grow.

According to some embodiments, an optimized irrigation plan may include recommendations for particular smart irrigation systems and a layout plan if such systems are not already installed at the selected site. As with the optimum plant factors, system layout recommendations may be made by a recommendation engine using preset algorithms or dynamic algorithms incorporating machine learning. For example, if no irrigation system currently exists at the selected site, an optimized irrigation plan may present to user 103 a plan for a smart irrigation system including specifications and layout for system components such as water feed lines, watering stations, valve types, irrigation control units and sensors.

According to some embodiments, if legacy irrigation systems exist at the selected site, ESP 120 may prompt user 103 for additional information regarding the legacy systems if such data is not already available. For example, user 103 may, via device 104, define the current legacy irrigation system layout. According to some embodiments, this process may take place during the survey process described at step 201 with reference to FIGS. 2 and 3A-3G. For example, just as user 103 was provided with options to define landscape areas in the selected parcel (See e.g., FIGS. 3C-3G) a user may be provided with options vi an interface similar to interface 300c-300g) to populate the landscape area with the components of the legacy irrigation system. Based on information provided or already available regarding the legacy irrigation systems, ESP 120 (via a recommendation engine) may recommend one or more converter units (e.g., smart converter 107 as shown in FIG. 1), sensors 108, and/or communications (e.g., WiFi routers, etc.) necessary to convert legacy irrigation system into a smart irrigation system.

Along with product recommendation, ESP 120 may recommend local or online retailers through which to purchase the components as well as options to purchase the components directly via ESP 120. According to some embodiments, transactions may be performed via a third-party service 140. ESP 120 may also provide information regarding local vendors and installers (e.g., contact info, reviews, quotes, etc.) that may be able to assist in installing a new irrigation system or upgrading a legacy irrigation system.

Automated Irrigation Scheduling

Retuning to FIG. 2, at step 207, in response to analysis and correlation of relevant data, at ESP 120 may automatically regulate irrigation at the selected site (e.g., site 190). According to some embodiments, ESP 120 may include a schedule generator 230 that may be configured to generate an optimized irrigation schedule and ESP 120 may be configured to transmit the irrigation schedule to an ICU 106 and/or smart converter 107 which may interpret the irrigation schedule and transmit control signals to the valves at watering stations located at site 190 to regulate the irrigation at the site according to the generated schedule. According to some embodiments, ESP 120 may transmit control signals based on an irrigation schedule (as opposed to the irrigation schedule) directly to an ICU 106 or smart converter 107 at appropriate time intervals to follow the generated irrigation schedule.

Schedule generator 230 may generate the optimized irrigation schedule based on calculated evapotranspiration (ET), effective rainfall, and any other data regarding the irrigation site, plants to be irrigated, and/or components used in the irrigation process. Additional information on how schedules are generated may be found herein under the sections titled "Plant-Specific Hyper-Local Evapotranspiration" and "Predicted Weather-Look Ahead Scheduling."

According to some embodiments, an ICU/smart converter 106-107 may transmit a schedule request signal to ESP 120 at regular or irregular intervals, for example, every day/hour/ or 15 mins, depending on the systems and/or user requirements. According to some embodiments, ESP 120 may push the irrigation schedule or other control signals to an ICU/smart converter 106-107 without a request form the device at the site. According to some embodiments, an ICU/smart converter 106-107 may transmit site related data (e.g., system diagnostic/fault data or sensor data from sensors 108) to ESP at regular or irregular intervals. According to some embodiments, schedule generator may adjust the algorithms and/or equations used to generate the ET schedule based on feedback data received.

Irrigation Management Dashboard

Figure 5:
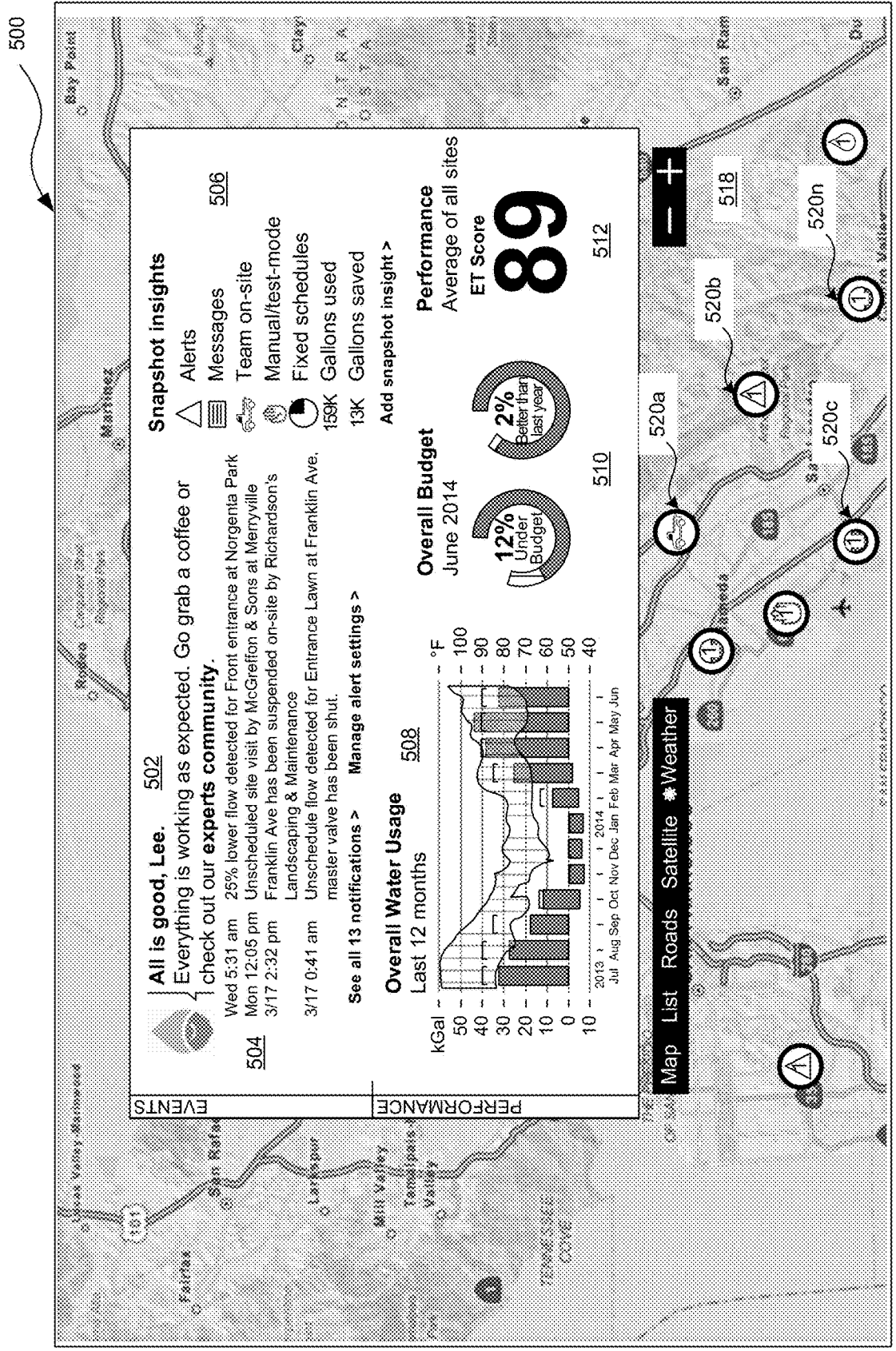
FIG. 5 depicts a screen capture of an example irrigation management dashboard interface.

FIG. 5 depicts a screen capture of an example irrigation management dashboard interface 500 through which a user 103 may manage one or more irrigation sites via ESP 120 using a device 104. As shown in FIG. 5, according to some embodiments, irrigation management dashboard 500 may include an overall status update 502, an event log 504, a snapshot insight 506, a current overall water usage display 508, an overall water budget 510, and a performance index score 512. Further, management dashboard 500 may include a map 518 showing all of the irrigation sites 520a-520n that the user 103 is managing via ESP 120.

According to some embodiments, irrigation management dashboard may be presented to user 103 via an application 250 (as shown in FIG. 2) instantiated at device 104. Alternatively, application 250 may be cloud-based with access provided via a web-based interface at a browser instantiated at device 104. Also, a person having ordinary skill will recognize that, according to some embodiments, applications 240, 250, and 260 may be part of the same software application.

According to some embodiments, overall status update 502 may present to user 103 an overall status of their one or more irrigation systems operating under ESP 120. The illustrative example in FIG. 5 depicts a positive status for the one or more systems, signaling "all is good." Further, the overall status includes a link to "experts in the community." Third-party services and/or products may be integrated with an irrigation management dashboard 500. For example, if the overall status 502 indicated a problem at a particular system component, overall status 502 may present products and/or services (as well as links or other access) that may be of use to user 103 in addressing the issue.

According to some embodiments, event log 502 may present to user 103 a log of notable events sensed and recorded at the one or more irrigation sites. For example, one entry in the log here reads, "25% lower flow detected at front entrance at Norgenta Park." This information may be sensed by flow sensors installed at watering stations at the irrigation site. According to some embodiments, data regarding such an event may be processed at the ICU/smart converter 106/107 and transmitted to ESP 120 where it may be interpreted and displayed as part of an event log 504.

According to some embodiments, snapshot insights 506 may present to user 103 general data regarding the operations at the irrigation site. For example, snapshot insights 506 may include statistics on water used and saved, indications of status for various components, alert messages, etc.

According to some embodiments, overall water usage 508 and budget 510 may present charts and graphs of the overall water usage and expenditures over a certain time interval, providing user 103 with a quick indication of how water usage at irrigation sites has changed over time a general idea of how that is fitting within a preset budget.

According to some embodiments, performance index score 512 may present to user 103 a quantified score indicating the efficiency of their irrigation plan and/or history of operation. This index score may be based on a number of factors including, but not limited to, water/cost savings compared to a statistical median or average consumption profile, irrigation technical efficiency (i.e., related to the ratio of water added to a site through irrigation to water lost to environmental factors such as evaporation, runoff, and deep percolation), and any other factors indicating efficient yet effective irrigation of plants at a given site. As shown in FIG. 5, the performance index score 512 may be represented as a value on a scale of 0 to 100. However, it will be appreciated that performance index score 512 shown in FIG. 5 represents and exemplary embodiment, provided for illustrative purposes. A person having ordinary skill will recognize that there are a number of ways (textual, graphical, or otherwise) that a performance index value score may be presented to a user 103 via a management dashboard 500. For example, according to some embodiments, performance index score may be presented visually as a variable color that changes from red (indicating low irrigation effectiveness/efficiency) to green (indicating high irrigation effectiveness/efficiency).

According to some embodiments, management dashboard 500 may present interface functionalities to user 103 allowing the user to administer irrigation at the site. According to some embodiments, these functionalities may include, but are not limited to, options to modify site survey information, options to set user preferences for data analytics and irrigation schedule generation, options to access third-party services, options to set planting priorities affecting look ahead scheduling, options to set access permissions for other irrigation administers, and options to imitate direct control over irrigation at a managed site. For example, according to some embodiments, dashboard 500 may present user 103 with a detailed map of each of their managed irrigation sites. By selecting particular ICU/smart converters, or watering stations displayed on the interactive map, a user 103 may initiate direct control over irrigation. In other words, in response to user input, ESP 120 may transmit stop and start signals to a particular ICU/smart converter directing it to start or stop irrigating.

In general, FIG. 5 represents an example embodiment shown for illustrative purposes. A person having ordinary skill will recognize that there are any number of ways of presenting information associated with the performance of irrigation systems integrated with an ESP 120, while remaining within the scope of the present teachings.

Example Methods for Providing Services via an Environmental Services Platform

FIGS. 6A-6E are flow charts that illustrate example methods for providing services via an Environmental Services Platform. The methods described in FIGS. 6A-6E follow the processes described earlier with respect to FIGS. 1-5. Elements shown in FIGS. 1-5 are referenced in the below described methods of FIGS. 6A-6E.

Figure 6A:
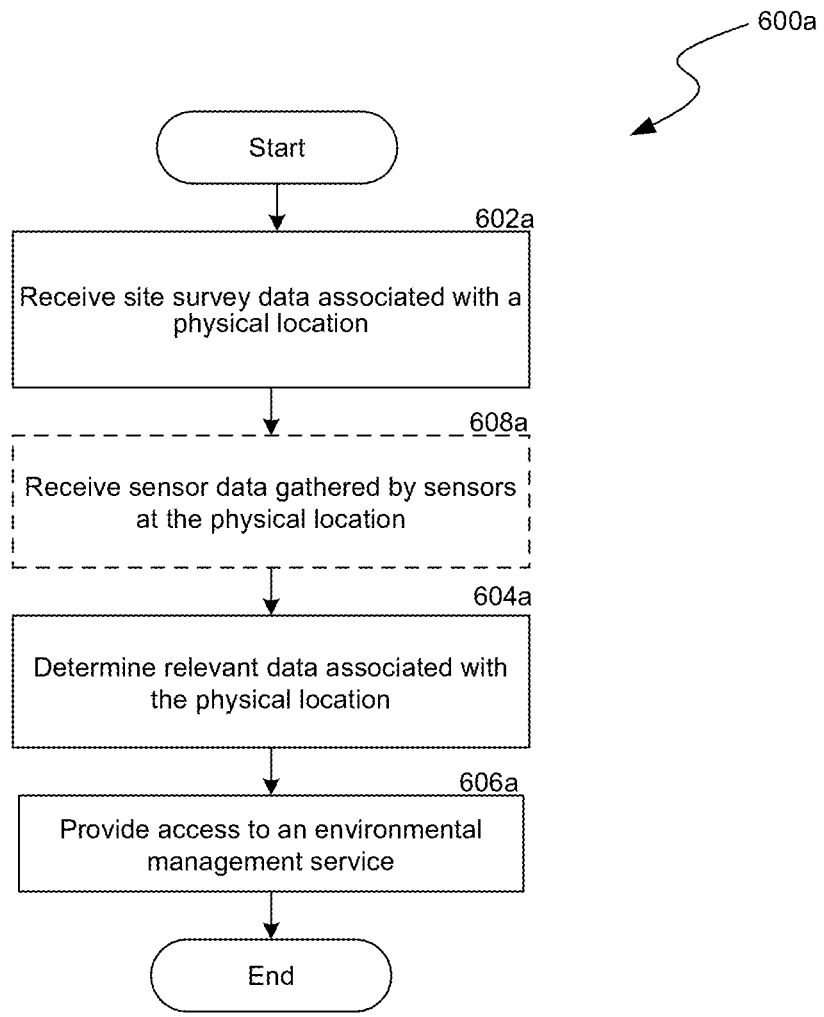
FIGS. 6A-6F depict flow charts illustrating example methods for implementing an environmental services platform.

FIG. 6A is a flow chart illustrating an example computer-implemented method 600a for providing environmental management services using available data from a plurality of data sources.

As shown in FIG. 6A, the method begins at step 602a with receiving site survey data associated with a physical location. For example, one or more computer devices associated with an ESP 120 may receive via a network 110, site survey data associated with a physical location (e.g., a parcel of land 306, a landscape area 318, an irrigation site 190, a building, or any other physical area or structure etc.). In some embodiments, site survey data is entered by a user 103 via an interface 300a-g presented via a device 104 and transmitted by device 104 to ESP 120 via network 110. In some embodiments, interface 300a-g is generated by a site survey application instantiated at user device 104 and/or at a computer device associated with ESP 120. In some embodiments, site survey application 240 is a web-based application accessible via a web browser application instantiated at user device 104. In some embodiments, site survey data includes one or more of an address or positioning coordinate of the physical location (e.g., irrigation site 190), defined boundaries of a landscape area 318 located at the physical location, or landscape characteristics associated with the physical location. In some embodiments, the landscape characteristics associated with the physical location include one or more of, information associated with installed or planned irrigation system equipment (e.g., legacy 170 and smart 180 irrigation systems, smart irrigation control units 106, smart converter units 107, sensors 108, and sprinklers) at the physical location, information associated with current or planned features (e.g., plant types, soil types, topography, natural resources, shaded areas, etc.) of the physical location, and information associated with current or planned features (e.g., plant types, soil types, topography, natural resources, shaded areas, etc.) of land surrounding the physical location.

Method 600a continues at step 604a with determining relevant data associated with the physical location based on identified correlations between the site survey data and available data from one or more data sources (e.g., data source 150), wherein the available data includes landscape data and environmental data. In some embodiments, the one or more data sources are remote third-party data sources accessible via a network 110. In some embodiments, the one or more data sources include one or more of, educational or research institution data sources, weather forecast service data sources, geographic information service data sources, government records data sources, utility data sources, and plant type data sources. In some embodiments, landscape data includes one or more of, soil data, geographic data, geological data, topographical data, and plant data. Environmental data includes one or more of, climate data, weather data, sunlight data, natural resource data, and ecological data. An example method 600b for determining relevant data is described in further detail in FIG. 6B.

Method 600a continues at step 606a with providing access to an environmental management service, the environmental management service based in part on the relevant data associated with the physical location. For example, ESP 120 may provide access to environmental management services via network 110 and one or more applications or service engines (e.g., applications 230, 240, 250, 260 and service engines 220) instantiated at a user device 104, one or more computer device associated with ESP 120, and or one or more devices located at the physical location (e.g., ICU 106 or smart converter 107). Example methods associated with the environmental management services are described in more detail in FIG. 6C.

Method 600a may optionally include step 608a with receiving sensor data gathered by one or more sensors 108 located at the physical location. For example, sensor data gathered at sensors 108 located at a physical location may be received via network 110 by computer devices associated with ESP 120. In some embodiments, at least a subset of the sensor data may be included with the relevant data and may be incorporated in the provision of environmental management services as described at step 606a

Figure 6B:
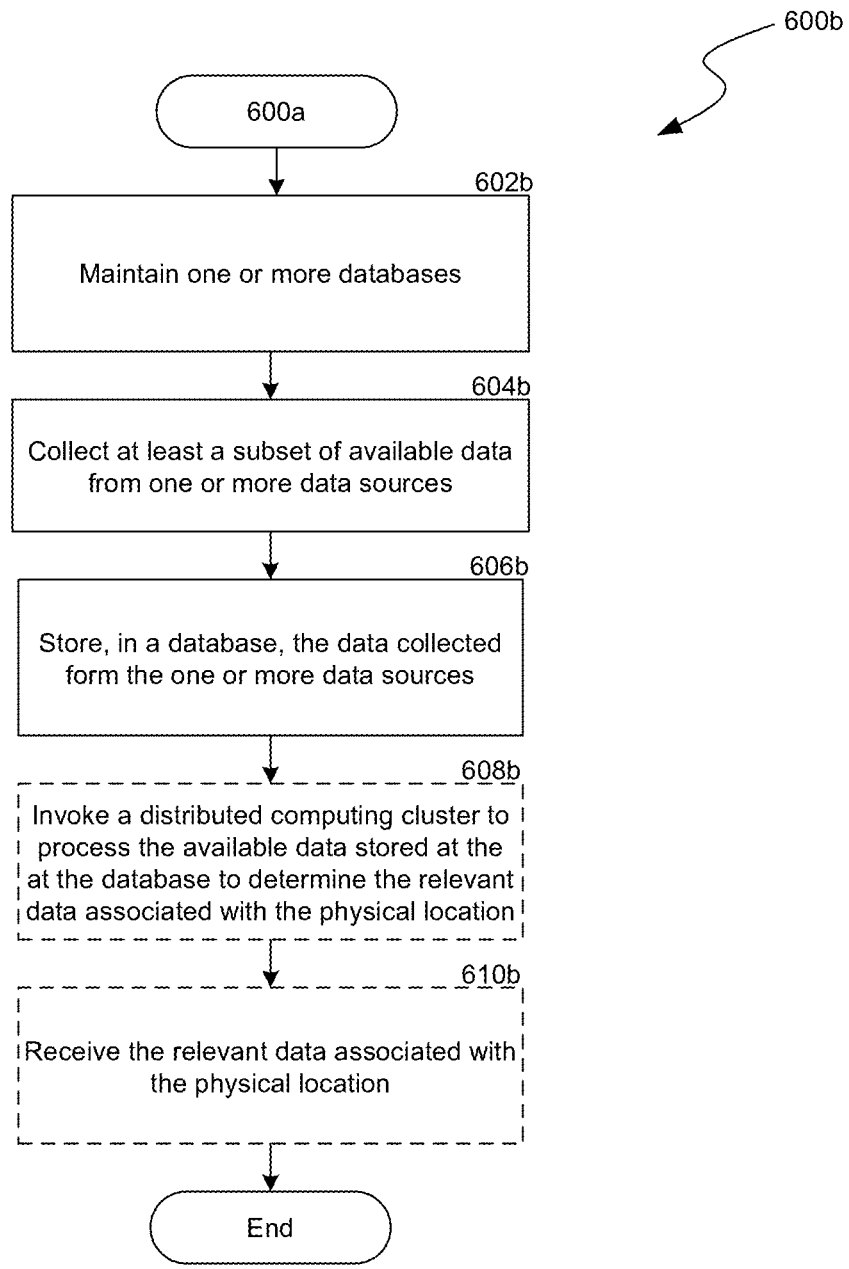

FIG. 6B is a flow chart illustrating an example computer-implemented method 600b for determining relevant data associated with a physical site. In some embodiments, method 600b includes the steps of method 600a shown in FIG. 6A.

As shown in FIG. 6B, method 600b begins at step 602b with maintaining one or more databases, for example as part of a data storage 130 associated with ESP 120. As described with reference to FIGS. 1 and 2, the term "database" may include data stores, data warehouses, or any other data structure types. In some embodiments, the one or more databases may include one or more key-value databases.

Method 600b continues at steps 604b and 606b with collecting at least a subset of available data from one or more data sources and storing at least a subset of the available data (including metadata) from the one or more data sources in the one or more databases.

Method 600b continues at steps 608b and 610b with invoking one or more distributed computing clusters to process the available data stored in the one or more databases to determine the relevant data associated with the physical location and receiving the relevant data associated with the physical location based on the processing by the one or more distributed computing clusters. As described previously with reference to FIG. 2, in some embodiments, ESP 120 may include one or more job engines configured to process data via a cluster of computing devices implementing a distributed file system. For example, a Hadoop Distributed File System (HDFS) may employ a MapReduce engine to which client applications (e.g., applications 240-260 referenced in FIG. 2) may submit MapReduce jobs as part of a task (e.g., the processing of available data and metadata stored at the one or more databases) to be performed by the distributed computing cluster. In some embodiments, the processed relevant data received at step 610b may be stored at data store 130 (e.g., in one or more databases) for use in providing environmental management services.

Figure 6C:
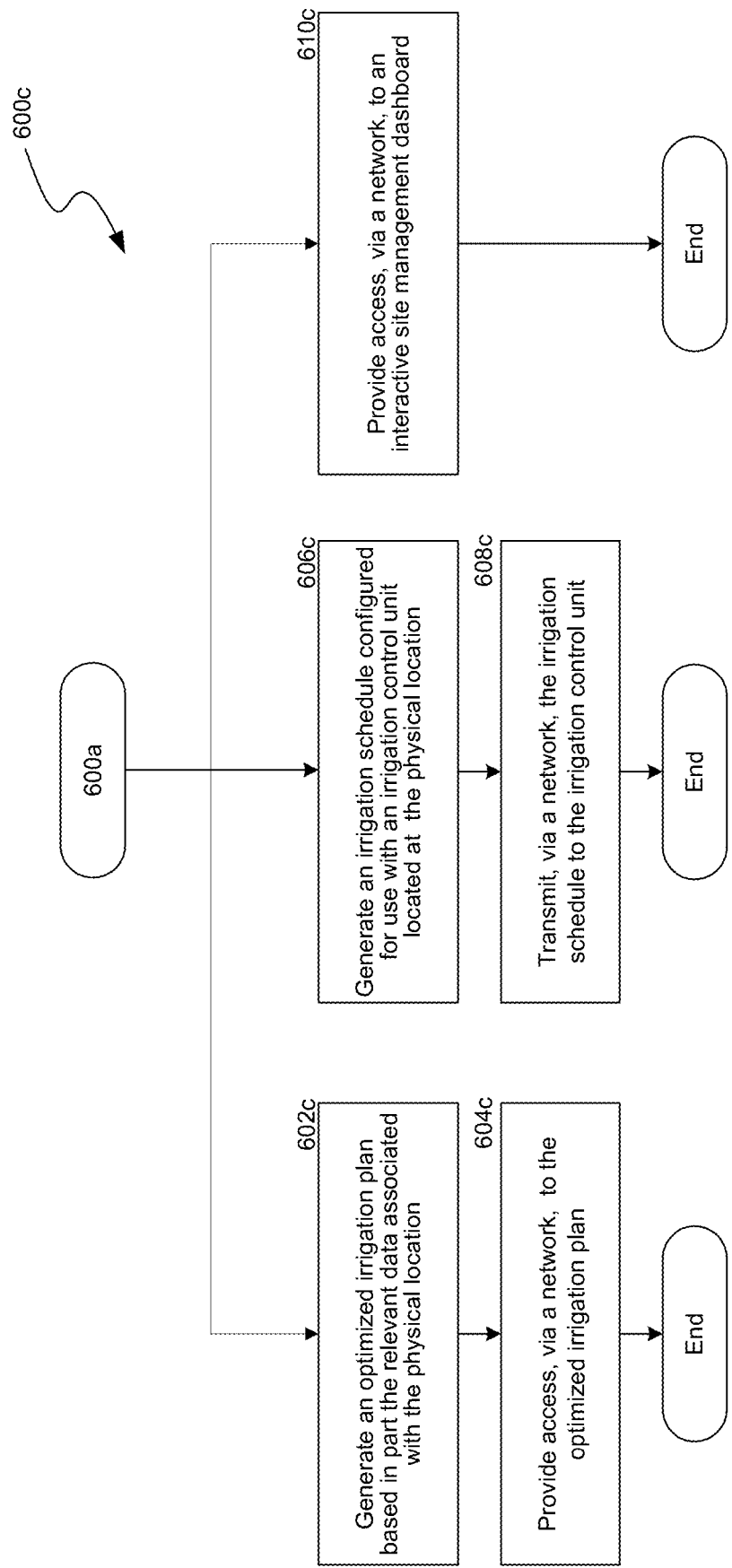

FIG. 6C is a flow chart illustrating example computer-implemented methods 600c for providing one or more environmental management services via ESP 120.

Steps 602c and 604c describe a process of providing an optimized irrigation plan as an environmental management service. At step 602c, one or more processors (e.g., part of one or more computing devices associated with ESP 120 and/or user device 104) generate an optimized irrigation plan based in part on the relevant data associated with the physical location. At step 604c one or more computing devices associated with ESP 120 and/or user device 104 provides access, via network 110, to the optimized irrigation plan. For example, a user 103 may access information associated with an optimized irrigation plan via a user device 104. An example optimized irrigation plan is shown as presented via interface 400a at FIG. 4A. In some embodiments, the optimized irrigation plan includes one or more of, current water usage and expenditure data, historical water usage and expenditure data, and predicted water usage or expenditure data. In some embodiments, the optimized irrigation plan includes recommendations for one or more of, alternative plant varieties and plant coverage layouts, alternative soil types, agriculture related products and services, including irrigation related products and services, or irrigation schedules. In some embodiments, the optimized irrigation plan is generated to minimize water usage by irrigation systems at the physical location (e.g., legacy 170 and smart 180 irrigation systems, smart irrigation control units 106, smart converter units 107, sensors 108, sprinklers, etc.). In some embodiments, the available data includes data from a water utility. In such an embodiment, the optimized irrigation plan may be generated to minimize expenditures on water. For example, a utility may charge more for water during certain peak hours or dates or may provide rebates for efficient and/or smart irrigation equipment. An irrigation plan optimized to reduce expenditures may recommend certain times to water and/or equipment to use. Additional information regarding optimized irrigation plans can be found with reference to FIG. 4A.

Steps 606c and 608c describe a process of providing an irrigation schedule as an environmental management service. At step 606c, one or more processors (e.g., part of one or more computing devices associated with ESP 120 and/or user device 104) generate an irrigation schedule for an irrigation site (e.g., irrigation site 190) at the physical location, the irrigation schedule configured for use with one or more irrigation control units (e.g., smart ICU 106 and/or smart converter 107) located at the irrigation site at the physical location. At step 608c, data associated with the irrigation schedule is transmitted, via a network (e.g., network 110), to the one or more irrigation control units (e.g., smart ICU 106 and/or smart converter 107) at the irrigation site. In some embodiments, instead of transmitting an irrigation schedule, relevant data (or at least a subset of the relevant data) associated with the physical location is transmitted to one or more irrigation control units (e.g., smart ICU 106 and/or smart converter 107) at an irrigation site (e.g., irrigation site 190) located at the physical location where it is used to generate an irrigation schedule by one or more of the irrigation control units at the irrigation site.

Figure 6D:
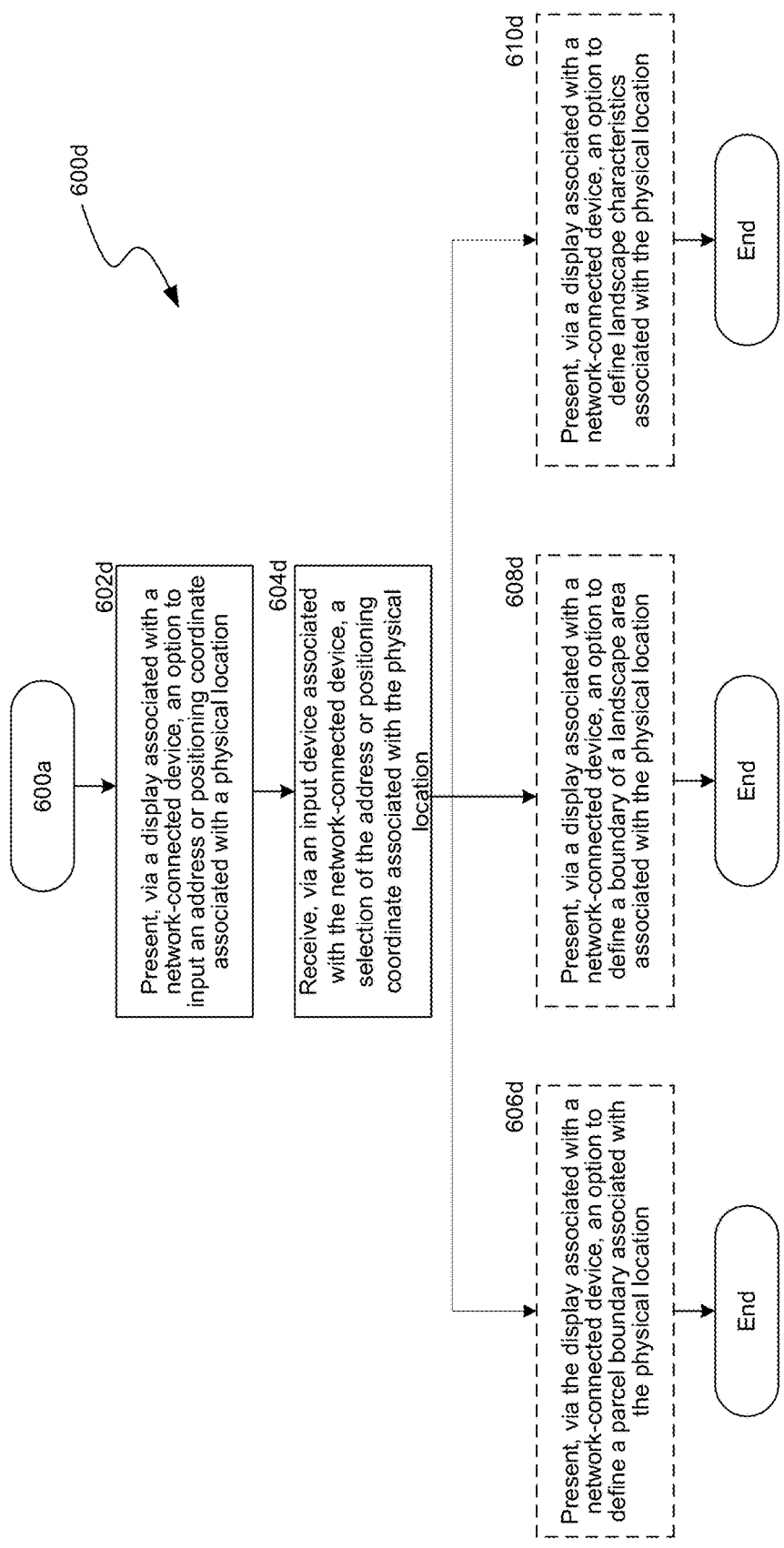

Step 610c describes providing access to an interactive site management dashboard as an environmental management service. For example, a user 103 may access the interactive site management dashboard via a user device 104. An example interactive site management dashboard is shown as presented via interface 500 at FIG. 5. In some embodiments, the site management dashboard includes one or more of, an overall status update, an event log, including snapshot insights, a map of the physical location including one or more network-connected assets, options to remotely control one or more of the network connected assets, energy or water usage data, and a performance index score. The performance index score is a quantified score indicating the efficiency of water and/or energy use at the physical location. Additional information regarding the interactive site management dashboard can be found with reference to FIG. 5. FIG. 6D is a flow chart illustrating example computer-implemented methods 600d for presenting a site survey interface. In some embodiments, method 600d includes the steps of method 600a shown in FIG. 6A.

Method 600d begins at step 602d with presenting, via a display associated with a network connected device (e.g., user device 104), an option to input an address or positioning coordinate associated with a physical location. In an embodiment, a site survey application 240 instantiated at one or more computing devices associated with ESP 120 generates a graphical interface (e.g., interface 300a shown in FIG. 3A) that is configured to be presented via a display associated with user device 104. In this embodiment, interface 300a includes an option to input an address or positioning coordinate in an editable field. In some embodiments, interface 300a may be accessible via a web browser application instantiated at user device 104.

Method 600d continues at step 604d with receiving, via an input device associated with the network connected device, a selection of the address or positioning coordinate. In some embodiments, the input device and display device are combined as a touch screen device associated with user device 104. The selection may include entering text/digits of an address or positioning coordinate into an editable field, selecting an area of a displayed map, and/or selecting a parcel of land from a set of available parcels (e.g., by selecting from a drop-down menu). In some embodiments, the selection input is transmitted via network 110 to ESP 120.

Method 600d branches after step 604d.

In an embodiment, method 600d continues at step 606d with presenting, via the display associated with the network-connected device (e.g., device 104), an option to define a parcel boundary associated with the physical location. This process is described in more detail with reference to FIGS. 3B-3C in which option 312b is presented via interfaces 300b-300c to define and/or adjust a boundary around parcel 306.

In an embodiment, method 600d continues at step 608d with presenting, via the display associated with the network-connected device (e.g., device 104), an option to define a boundary of a landscape area associated with the physical location. In some embodiments, the landscape area is a defined sub area located within a defined parcel (e.g., as defined by step 606d). This process is described in more detail with reference to FIG. 3D in which option 312d is presented via interfaces 300d to define and/or adjust a boundary around landscape area 318 located within parcel 306.

In an embodiment, method 600d continues at step 610d with presenting, via the display associated with the network-connected device (e.g., device 104), an option to define landscape characteristics associated with the physical location. In some embodiments, the landscape characteristics are associated with a defined sub area (e.g., a landscape area as defined by step 608d) located within a defined parcel (e.g., as defined by step 606d). This process is described in more detail with reference to FIGS. 3E-3G in which option 320e is presented via interfaces 300e-g to define landscape characteristics associated with landscape areas 318, 322, and 324 located within parcel 306.

Figure 6E:
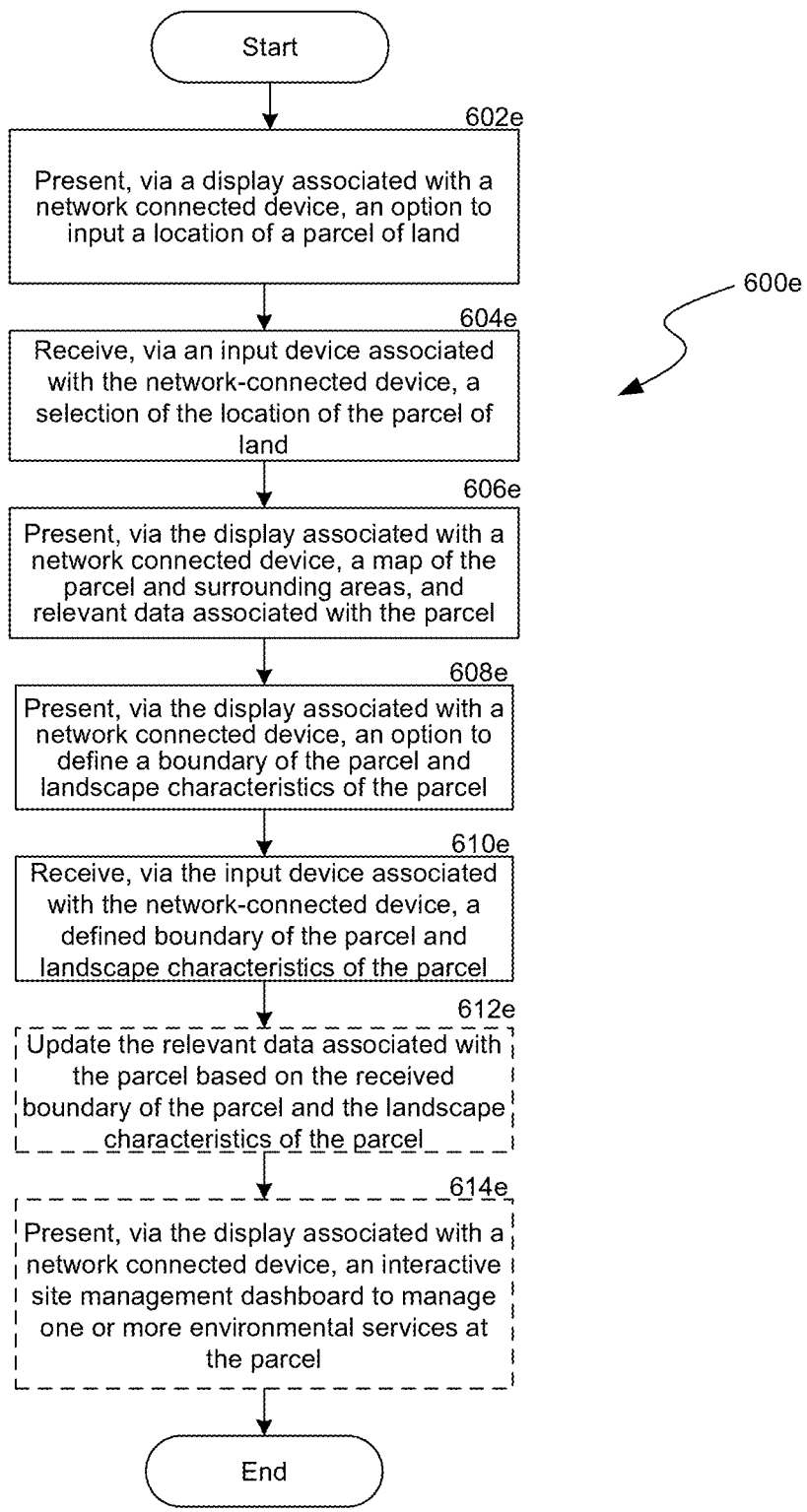

FIG. 6E is a flow chart illustrating example computer-implemented method 600e for presenting a site survey interface. Additional information regarding the interactive site survey interface can be found with reference to FIGS. 3A-3G.

Method 600e begins at step 602e with presenting an option, via a display device associated with a network connected device (e.g., user device 104), an option to input a location of a parcel of land. Step 602e is analogous to step 602d described with reference to FIG. 6D.

Returning to FIG. 6E, method 600e continues at step 604e with receiving, via an input device associated with a network-connected device, a selection of the location of land. Step 604e is analogous to step 604d described with reference to FIG. 6D.

Returning to FIG. 6E, method 600e continues at step 606e with presenting, via the display device associated with a network connected device, a map of the parcel of land and, in some embodiments, the areas surrounding the parcel of land, and in some embodiments, relevant data associated with the parcel of land. For example, interface 300b shown in FIG. 3B may be presented via a display associated with user device 104. Interface 300b includes a map 304 of parcel 306 and surrounding areas 310. Interface 300b also includes relevant data 308 associated with the parcel 306.

Returning to FIG. 6E, method 600e continues at step 608e with presenting, via the display associated with a network-connected device, an option to define a boundary of the parcel and characteristics of the parcel. Step 608e is analogous to steps 606d, 608d, and 610d described with reference to FIG. 6D.

Returning to FIG. 6E, method 600e continues at step 610e with receiving, via the input device associated with a network-connected device, a defined boundary of the parcel and one or more characteristics of the parcel.

Method 600e continues at optional step 612e with updating the relevant data associated with the parcel based on the received defined boundary of the parcel and the one or more input characteristics of the parcel.

Method 600e continues at optional step 614e with presenting, via the display associated with the network-connected device, an interactive site management dashboard to manage one or more environmental services at the parcel. An example interactive site management dashboard is shown as presented via interface 500 in FIG. 5.

Plant-Specific Hyper-Local Evapotranspiration

The general concept of basing irrigation schedules based on calculated rates of evapotranspiration (ET) is known in the art. For example, U.S. Pat. No. 7,596,429 (previously mentioned and incorporated into this application by reference) issued to Cardinal et al., describes a smart irrigation system that bases irrigation schedules in part on calculated rates of ET. According to some embodiments, a system in accordance with the present teachings may be configured to generate irrigation schedules based on previously established methods of calculating ET. However, by incorporating multiple data from multiple sources, including from external sources 150, sensors 108, and site survey user inputs, a more accurate assessment of current watering needs at a given site may be established. This may be referred to as hyper-local evapotranspiration, and according to some embodiments, plant-specific hyper-local evapotranspiration.

With reference to FIG. 2, according to some embodiments, ET and effective rainfall data may be computed based on various sources of data including, but not limited to, soil data 150a, plant data 150b, weather data 150c, solar radiation data 150d, geographic data 150e, other data 150n, site specific data from the site survey input by user 103, and sensor data from sensors 108 located at the specific site 190. As previously discussed, irrigation schedules and/or other irrigation events may be computed based on the ET and effective rainfall data.

Figure 6F:
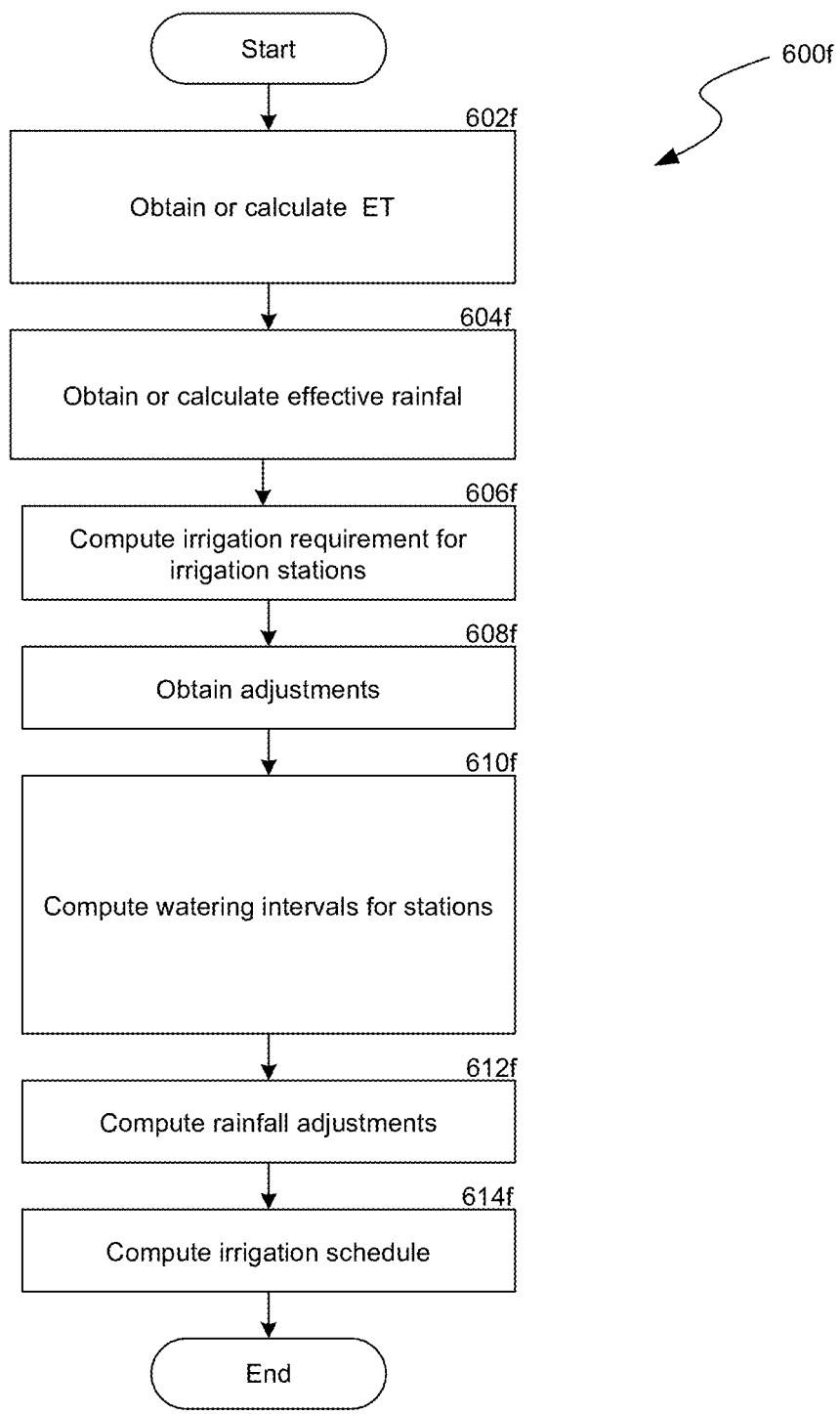

FIG. 6F is a flowchart illustrating an example method 600f for deriving an irrigation schedule according to some embodiments. In this example, a reference ET (denoted as $ET_o$) may be first obtained or calculated at step 602f. Reference $ET_o$ is generally understood to be based on a hypothetical crop, for example a common grass or alfalfa. While this may be used, according to some embodiments, reference ET may represent an approximate actual ET at a given site. It is understood that each plant type may exhibit unique transpiration characteristics, which may further be dependent on the type of soil used, and levels of solar radiation at the site. Further, evaporation characteristics at a given site may depend on the soil present, the amount of shade and progression of shade throughout the day, slope of the landscape, altitude, etc. Accordingly, an $ET_o$ value based on actual plant and site-specific data may be far more useful than one based on a hypothetical crop in determining optimized irrigation schedules. Further, recalculation of ET values at small intervals (e.g., ever 15 mins) may result in even greater accuracy as to current ET characteristics at the irrigation site. This is what is referred to as plant-specific hyper-local evapotranspiration.

$ET_o$ used in this example may be the accumulated amount of evapotranspiration for a preceding period. $ET_o$ is preferably measured as amount of water per time interval (e.g., inches of water per day). According to some embodiments, the $ET_o$ is accumulated for the preceding seven days (a rolling seven day average) and this value is used to determine the irrigation requirement for the next seven days. In another example, the $ET_o$ is accumulated for the preceding day and this value is used to determine the irrigation requirement for the next day.

In some embodiments, the reference ETo may be calculated for each microclimate zone within the ESP service area using weather data 150c supplied by a local weather station or other data source (e.g., Accuweather). According to some embodiments, the $ET_o$ may be calculated specifically for an irrigation site (e.g., site 190) based on all relevant data available to ESP 120, including but not limited to soil data 150a, plan data 150b, weather data 150c, solar radiation data 150d, geographic data 150e, other data 150n, data from sensors 108 at the irrigation site, and data regarding the irrigation site input by user 103 during the site survey process described with respect to FIGS. 1-2. Weather data may weather data 150c gathered from external sources and weather data gathered at the site via sensors 108. Weather data may also include interpolated weather data based on the prediction methods described in more detail herein under the section titled, "Weather Prediction—Look Ahead Scheduling."

The ESP 120 may use suitable equations such as ASCE, FAO Penman-Monteith or any other appropriate methods to compute ETo.

ETo values may be computed daily, hourly, every 15 minutes, or as often as set by ESP 120. It will be understood that shorter intervals between calculations may result in more accurate ETo values and consequently increased watering efficiency.

Next, the amount of effective rainfall is calculated for any rainfall event at step 604f. In this example, effective rainfall may be the accumulated amount of rainfall for the preceding period absorbed into the plant root zone. Effective rainfall is preferably measured as amount of water per time interval (e.g., inches of water per day). In one example, effective rainfall is determined by multiplying the amount of accumulated rainfall for the preceding day by an effectiveness factor. The amount of effective rainfall is then used to determine the amount of time to suspend irrigation for each watering station at the irrigation site.

In some embodiments, the effective rainfall is calculated for each microclimate zone within the ESP 120 service area using rainfall data supplied by a local weather station, sensors or other data sources used by the ESP 120 (e.g., weather data 150c). According to some embodiments, effective rainfall may be calculated for specifically for each of one or more irrigation sites (e.g., site 190). According to some embodiments, effective rainfall may be calculated based on interpolated weather data using weather prediction methods described in more detail herein under the section titled, "Weather Prediction—Look Ahead Scheduling."

ESP 120 may use standard reference tables or any other appropriate methods to compute effective rainfall. Effective rainfall values may be computed daily, hourly, every 15 minutes, or as often as set by ESP 120. In some embodiments, the effective rainfall may be calculated at a local automated weather station (e.g., sensor 108) or other data sources used by the ESP 120 (e.g., weather source 150c).

Returning to the example shown in FIG. 6F, the irrigation requirement for each watering station may be calculated at step 606f. The irrigation requirement for a station is the total amount of water to be applied to that station during an irrigation event. Schedule generator 230 (part of ESP 120) may calculate the irrigation requirement for any period of time using any known formulas. The formula may be modified as a result of continued refinements to its system, new research and developments in irrigation science, input provided by local water agencies or other sources, user feedback, or other appropriate reasons. According to some embodiments, formulas for generating an irrigation schedule may be dynamically constructed using machine learning algorithms that may take into account data (e.g., sensor data) transmitted by sensors 108 and/or other components at the irrigation site 190 (e.g., ICU 106, smart converter 107, or irrigation systems 170-180). Through a cycle of calculating irrigation schedules based on available data, and adjusting schedules based on feedback data collected at the site, schedule generator 230 may continuously optimize irrigation efficiency at the irrigation site and dynamically respond to changing conditions (e.g., environmental, landscape and plant-based). In some embodiments, the calculation may take into account the water usage by other irrigation systems at a given site and balance the water usage among the various irrigation systems. In some embodiments, different methods may be used for calculating irrigation requirements in different geographical areas and for stations irrigated by different methods (e.g., sprinkler vs drip, etc.). The calculations may be based on input provided by the user through the site survey and management dashboard, geographic data, local water agency regulations, differing climatic conditions, different solar radiation data, etc. There are several factors that can be used to calculate the irrigation requirement for a station, such as the current reference ET, current soil moisture data, types and characteristics of plants to be irrigated, characteristics of the irrigated landscape, irrigation methods and preferences of user 103, local water agency regulations, and hyper-local historical, current, and forecasted ET. Here forecasted ET may be calculated based on the weather prediction methods described herein under the section titled, "Weather Prediction—Look Ahead Scheduling." According to some embodiments, the irrigation requirement may be determined using the water balance method. In some embodiments, the irrigation requirement may be determined using an accumulated ET threshold. In some embodiments, the irrigation requirement for a station may be fixed for all irrigation events and the irrigation schedule may vary based on changes in local ET. In some embodiments, the irrigation requirement for a watering station may be derived based on the following function: Irrigation requirement for station=$f$\{Root Depth, Soil Holding Capacity, Allowable Depletion, Precipitation Rate, Distribution Uniformity, Maximum Cycle Time, Minimum Soak Time, User 103 Adjustment, ESP 120 Adjustment\}

In the function above, the Root Depth is the root depth of the plants to be irrigated (e.g., based on plant data 150b and/or input provided by user 103), Soil Holding Capacity is the amount water that a given soil type can hold per foot of soil (e.g., based on soil data 150a and/or input provided by user 103), Allowable Depletion is the level of soil moisture depletion allowable before irrigation must occur, Precipitation Rate is the rate that water is applied to the landscape (e.g., based on hyper-local historical, current and/or predicted precipitation), Distribution Uniformity is the efficiency of water being applied (e.g., based on a number of factors, including but not limited to sprinkler type, soil type, wind characteristics, etc.), Maximum Cycle Time is the maximum length of time that water can be applied before runoff occurs, Minimum Soak Time is the minimum amount of time required between irrigation cycles, User Adjustment is a user 103 adjustment to the amount of water being applied, and the ESP 120 Adjustment is an adjustment made by ESP 120 system (e.g., by schedule generator 230) based on feedback data collected at the irrigation site.

For illustration purposes, the following values are assumed for the function above:
Root Depth: 18 inches
Soil Holding Capacity for Loamy Soil: 1.5 inches of water per foot of soil
Allowable Depletion: 50%
Precipitation Rate: 2.0 inches per hour
Distribution Uniformity: 70%
Maximum Cycle Time: 10 minutes
Minimum Soak Time: 10 minutes
User Adjustment: 100% (No Change)
ESP Adjustment: 100% (No Change)

In one embodiment, the irrigation requirement for a station with the above assumed values is calculated as follows:

Water Amount to be applied=18×1.5/12×50%=1.13 inches

Run Time Multiplier=1/(0.4+(0.006×70%))=1.22

Total Runtime=(1.13/2.0)×1.22×60=41.16 minutes

Number of Cycles=41.16/10=4.116 (Rounded Up=5)

Irrigation Requirement: 8.23 minutes per cycle, 5 cycles, with 5 minutes soak time between cycles.

Optionally, adjustments to the system may be obtained at step 608f. In some embodiments, the adjustments include user 103 adjustments made, for example, via a management dashboard. In the above example, the user adjustment is a percentage change made by the user to the irrigation requirement for one or more stations. In some embodiments, various aspects of the watering schedule for an ICU/smart converter, including the irrigation start time, watering days or non-watering days, and other factors can also be modified. In some embodiments, the user can override the automated watering schedule for any station by specifying a new schedule with different watering days, run times, etc.

In some embodiments, the adjustments include automated adjustments from the ESP 120. In the above example, the ESP adjustment may be a percentage change made by ESP 120 based on feedback data received from sensors 108 or other components at the irrigation site. In some embodiments, various aspects of the watering schedule for an ICU, including the irrigation start time, watering days or non-watering days, and other factors may also be modified. In some embodiments, the ESP 120 may override the automated watering schedule for any ICU/smart converter by specifying a new schedule with different watering days, run times, etc. Details of the ESP adjustments are discussed below.

After any adjustments are computed at step 608*f*, the watering interval for each station may be derived at step 610*f*. The watering interval may be an estimated time in between irrigation events assuming weather conditions remain constant and there are no rainfall events. There are different methods for determining the watering interval. In some embodiments, the watering interval for a station is derived using the following function: Watering interval for station=f{Root Depth, Soil Holding Capacity, Allowable Depletion, ETo, Plant Coefficient, Sun Exposure}

In the function above, the Root Depth is the root depth of the plants to be irrigated (e.g., based on plant data 150*b*), Soil Holding Capacity is the amount water that a given soil type can hold per foot of soil (e.g., based on soil data 150*a*), Allowable Depletion is the level of soil moisture depletion allowable before irrigation must occur, $ET_o$ is the reference evapotranspiration rate, Plant Coefficient is the plant coefficient for the current month for the types of plants in the irrigation zone (e.g., based on plant data 150*b* and information gathered from user 103 during the site survey), and Sun Exposure is an adjustment for the lack of sun exposure in the irrigation zone.

For illustration purposes, the following values are assumed for the function above:
Root Depth: 18 inches
Soil Holding Capacity for Loamy Soil: 1.5 inches of water per foot of soil
Allowable Depletion: 50%
ETo: 0.10 inches per day
Plant Coefficient: 0.8
Sun Exposure: 0.9

In one embodiment, the watering interval for a station with the above assumed values is calculated as follows:

$$\text{Water Amount to be applied} = 18 \times 1.5/12 \times 50\% = 1.13 \text{ inches}$$

$$\text{Watering Interval} = 1.13/(0.1 \times 0.8 \times 0.9) = 15.7 \text{ days}$$

After the watering interval for each station is computed at step 610*f*, the rainfall adjustment, if any, is calculated at step 612*f*. The rainfall adjustment is used to adjust the watering schedule for an ICU/smart converter in the event of rainfall. In some embodiments, the rainfall adjustment for an ICU delays watering for each station by the amount of the rainfall adjustment. There are different methods for determining the rainfall adjustment. In some embodiments, a rain sensor 108 is located at the irrigated site 190 and irrigation is suspended directly by the sensor 108 in response to currently sense precipitation. In some embodiments, the rainfall adjustment may be derived by ESP 120 (through schedule generator 230) using historical, current and/or predicted rainfall data provided by weather data sources 150*c* (e.g., Accuweather™) and/or sensors 108 at irrigation site 190. According to some embodiments, the rainfall adjustment may be calculated by ESP 120 using the following function:

$$\text{Rainfall adjustment} = f\{\text{Rainfall, Rainfall Effectiveness, Average Daily } ET_o\}$$

In the function above, Rainfall is the amount of rainfall during the period, Rainfall Effectiveness is the rate of effectiveness of the rainfall, and Average Daily $ET_o$ is the average daily reference evapotranspiration rate. Effective rainfall may be estimated by rainfall data gathered by a rain sensor located at a local weather station or at the irrigated site.

For illustration purposes, the following values are assumed for the function above:
Rainfall: 0.2 inches
Rainfall Effectiveness: 70%
Average Daily $ET_o$: 0.05 inches per day In one embodiment, the rainfall adjustment using the above assumed values is calculated as follows:

$$\text{Rainfall adjustment} = (0.2 \times 0.7)/\times 0.05 = 2.8 \text{ days}$$

Returning to the example shown in FIG. 6F, the irrigation schedule for the ICU/smart converter 106-107 may be calculated at step 614*f*). The irrigation schedule may represent the complete, optimized schedule for all stations tied to a particular ICU/smart converter 106-107 that is sent by ESP 120 on a periodic basis. Updated irrigation schedules may be sent by ESP 120 to ICU/smart convert 106-107 automatically at predetermined intervals (e.g., every day/hour/15 minutes) or may be sent in response to sensed changes in conditions at the irrigation site (e.g., sensed by sensors 108), may be sent in response to requests by a smart ICU/smart converter 106-107, or may be sent in response to a request submitted by user 103, for example, via a management dashboard interface. There are different methods for determining the irrigation schedule for an ICU. In some embodiments, the irrigation schedule for a station is derived using the following function:

Irrigation schedule for an ICU=ƒ{Water Window, Irrigation Start Time, Non-Watering Days, Hourly Restrictions, Station Flow Rates, Maximum Allowable System Flow, Maximum Simultaneous Valve Limit, Individual Station Schedules}

In the function above, the Water Window is the range of hours during which the ICU may be required to complete its irrigation cycle on watering days. This may be set by user 103 via the management dashboard, according to some embodiments. The water window is preferably during nighttime and early morning hours. In some embodiments, user 103 may not be required to specify the start time for the irrigation cycle. In some embodiments, user 103 may select a window during which irrigation may occur and the ESP 120 may select the specific time interval for the irrigation cycle within that window. This design enables ESP 120 to shift ICU watering schedules if necessary to accommodate the needs of the ESP 120 (e.g., balancing resources) or to comply with watering regulations. For example, ESP 120 may shift irrigation start times to assist water agencies in shaping their demand curve and managing peak period usage. In some embodiments, the start time may be computed by the schedule generator 230. Schedule generator 230 may optimize the start time based on historical, current and forecasted ET, soil type, plant characteristics, etc.

According to some embodiments, an optimized watering schedule may be developed to reduce the amount of time required for watering. In some embodiments, if the optimized watering schedule developed by the schedule generator 230 exceeds a user-defined water window, then the user 103 may be provided with options to expand the water window and/or select one or more watering stations that may operate outside the water window so that higher priority stations are watered during the water window.

The Irrigation Start Time is the time the ICU/smart converter 106-107 commences its irrigation cycle on watering days. In this example, the irrigation start time applies to the entire watering cycle and is not station-specific. The start time is preferably set by ESP 120 (through schedule generator 230) during the water window selected by the property owner.

Non-Watering Days are days of the week when no irrigation is performed. In some embodiments, the non-watering days for individual stations are set according to the user's preference. In some embodiments, if the system-generated watering schedule for each station does not require watering every day, then the days that watering does not occur are the non-watering days. An example of a non-watering day may be the day of week that a landscape contractor or gardener performs weekly maintenance. Another example of a non-watering day may be an upcoming day predicted with high certainty to have precipitation, for example, according to the methods described herein under the section titled, "Weather Prediction—Look Ahead Scheduling."

Hourly Restrictions are hours during the day when no irrigation is performed. According to some embodiments, the hourly restrictions for individual stations may be set according to preferences set by user 103 or by regulations imposed by the local water agency.

Station Flow Rate is the normal flow of water for a station during an irrigation event. Station flow rates may differ between stations. Maximum Allowable System Flow is the maximum flow of water that can be obtained by the irrigation system during an irrigation event. Station flow rates and maximum allowable system flow are preferably measured in gallons per hour. In some embodiments, station flow rates and the maximum allowable system flow are used to determine the number of stations that may irrigate simultaneously. The sum of the station flow rates for all stations operating simultaneously may not exceed the maximum allowable system flow. In some embodiments, station flow rates and the maximum system flow are entered into a website by the user. In some embodiments, station flow rates are automatically gathered from a flow sensor attached a watering station and couple to the ICU/smart converter 106-107 and sent to ESP 120. In some embodiments, the default setting for the number of stations that may water simultaneously is one.

The Individual Station Schedule is the final, adjusted irrigation schedule for a particular time frame sent to the ICU/smart converter 106-107 to control an individual station. According to some embodiments, the individual station schedule includes the irrigation requirement, the watering interval, any user 103 or ESP 120 adjustments, any rainfall adjustments, any non-watering days, and any hourly restrictions for the station.

ESP 120 may minimize runoff during an irrigation event by limiting the duration of each irrigation cycle and utilizing minimum soak periods between cycles to ensure that water has been absorbed into the soil. The maximum cycle time and minimum soak time incorporated into the irrigation requirement for a station are calculated based on the precipitation rate (historical, current, and predicted), landscape slope, and soil type (e.g., based on soil data 150*a*). The precipitation rate is the rate at which water is applied to the landscape. It is a function of the type of sprinklers, sprayers, emitters, etc. which are used to apply water to the landscape. The slope of the landscape affects the absorbency of the soil and influences the duration of a single watering cycle. Factoring slope into the watering schedule can avoid a situation in which water runs off a surface because it is applied to the soil faster than it can be absorbed. The degree of landscape slope affects the maximum cycle time, the number of cycles, and the minimum soak time in between cycles. Soil type also affects maximum cycle time and minimum soak time. Dense soils have less absorbency and slower intake rates than porous soils. For this reason, denser clay soils require shorter cycle times and longer soak times than sandy soils. There are different methods for calculating maximum cycle times and minimum soak times to avoid runoff. In some embodiments, ESP 120 may use methods contained in a paper presented in November 1995 by Joseph Y. T. Hung and Arturo Mandoza entitled "Maximum Sprinkler Irrigation Runtime Without Runoff," a paper presented in November 1996 by Joseph Y. T. Hung entitled "Sprinkler Soaking Time Between First and Second Irrigation Cycles Without Runoff," an article written by Joseph Y. T. Hung, Ramesh Kumar, and Eudall Vis entitled "Sprinkler Irrigation on Slopes," and a paper presented in March 1988 by Anibal Blandon and Roger Johnson entitled "Irrigation Efficiencies for Various Slopes With Changing Riser Angles."

According to some embodiments, the optimized irrigation schedule may be derived based on user inputs such as the desired maximum time window during which the watering should occur, the maximum number of valves that the ICU/smart converter 106-107 can open at one time, the flow rate per valve, the maximum allowable flow for the ICU, etc. The watering schedule is calculated to reduce the amount of time required for watering. If the optimized irrigation schedule exceeds the user-defined water window, then the user is provided with options to expand the water window and/or select one or more drip-irrigated stations which can operate outside the water window so that the sprinkler-irrigated stations are watered during the water window.

In some embodiments, different algorithms may be used for calculating the irrigation requirement and/or irrigation schedule based on irrigation methods. Several examples of water algorithms include a water balance algorithm, a light-and-frequent algorithm and a deficit irrigation algorithm. The water balance algorithm is sometimes used for landscapes with sprinklers. Irrigation is applied when a predefined soil moisture threshold is reached. The light-and-frequent algorithm is sometimes used for landscapes with drip or bubbler irrigation. When the daily rate of ET reaches a certain minimum threshold (e.g., 0.1 inch per day), the amount of water lost through ET (adjusted for plant factors, seasonality, and shade factors) is replaced. The deficit algorithm is preferably used for plants that can be sustained with less than their optimal amount of irrigation water.

According to some embodiments, ESP 120 (through schedule generator 230) may automatically selects which algorithm to use based on relevant data available. In some embodiments, the user 103 may be presented with options to choose an algorithm, or options for assisting the schedule generator 230 to determine a suitable algorithm. For example, the user 103 may choose a conservation option that allows the schedule generator 230 to automatically calculate an acceptable reduction in water use based on the plant types. The level of irrigation below the optimal ET-based water level, referred to as deficit irrigation level, is specific to each station or zone of landscaping as well as the plant type for that station. In some embodiments, the amount of deficit irrigation for each station is calculated as a percentage of ET. In some embodiments, the user 103 may be given options to choose deficit irrigation automatically, semi-automatically or manually. The automatic option allows ESP 120 or the local water agency to automatically implement a predefined deficit irrigation conservation option. The semi-automatic option allows the ESP 120 to implement a predefined conservation option after the user elects to participate in deficit irrigation (also referred to as opt-in). The manual option allows the user 103 to initiate a request for using the conservation option by, for example, sending the request to ESP 120 via the management dashboard.

Weather Prediction—Look Ahead Scheduling

ESP 120 may include a weather prediction engine, which according to some embodiments, may be one of several service engines 220 as shown in FIG. 1. According to some embodiments, ESP 120 may collect historical, current, and forecast weather data form various sources, including but not limited to, external weather data sources 150c and sensor 108 at any given irrigation site 190. Based on a risk assessment based analysis, ESP 120 (including weather prediction engine 220 and irrigation schedule generator 230) may adjust irrigation scheduling based on predicted weather taking into account risk factor specific to the irrigation context. For example, limiting irrigation based on predicted precipitation where the water/cost savings may outweigh the risk of damage to plants due to lack of water. As another example, limiting irrigation or adjusting irrigation method based on predicted low temperatures so as to avoid damage caused by freezing. As another example, limiting irrigation or adjusting irrigation methods based on predicted high winds so as to avoid inefficiencies due to blown away water spray. As another example, limiting irrigation based on a prediction of snow.

ESP 120 (including weather prediction engine 220) may collect current weather data (including hyper local weather data from sensors 108) as well as forecast data for the next few days (according to some embodiments, approximately 7-14 days). Algorithms implemented by weather prediction engine 220 may include, 1) assessing a "surety" factor, and 2) assessing a risk factor.

The surety factor indicates a level of certainty that a predicted weather event may take place. For example, in the case of predicted precipitation, if the "chance of rain" changes for a particular day over a period of several days, the surety factor may decrease, due to the uncertainty in as indicated by the changing chance of rain. Similarly, if the changes in the chance of rain steadily tend in one direction (i.e., the chance of rain steadily increases), the surety factor may remain unaffected or increase. If the historical data indicates that rain has in the past occurred within a week or so of the current date then the surety factor may increase. Further, the surety factor may be greater for precipitation predictions for one day in the future as opposed to one week in the future.

The risk factor indicates the risk associated with stopping irrigation in advance based on a predicted weather event. Again, taking the example of predicted precipitation, decreasing levels of ET may indicate that the risk of stopping irrigation is lowered because the rate of water loss to evaporation and transpiration is diminished. Conversely, if current ET levels are high (i.e., water is rapidly lost to evaporation and transpiration) simply stopping irrigation for a day or two may damage the plants due to lack of water. In addition to calculated ET, risk factors may be based on plant specific characteristics. For example, newly planted trees may have relatively high-risk factors because inadequate watering may cause damage to the developing root systems. Alternatively, some succulents may have a relatively low risk factor with the cost in water of over-irrigating outweighing the potential damage caused by under watering.

Risk factors may also be based on user set preferences and/or government regulations regarding certain conditions. For example, risk factors for a region may be based on whether the region is experiencing a drought. In other words, while in general the risk of grass dying may be high due to inadequate irrigation, this risk factor may be adjusted lower to account for the greater societal cost of overwatering to keep ornamental plants alive. Conversely the risk factors may remain high or increase where the irrigation is being applied to critical agricultural crops. A user 103 via device 104 may be provided with options to set such risk factors or ESP 120 may automatically set the risk factors based on government regulations. According to some embodiments, a user 103 may set different risk factors for different irrigation sites or even for different areas within an irrigation site. Consider an example in which user 103 has set up a two irrigation sites (both with ornamental grass and newly planted trees) with smart irrigation systems connected to and ESP 120. User 103 may through a device 104 (perhaps via a management dashboard) set levels of priority to the two irrigation sites or to different landscape plots within a single irrigation site. For example, consider the landscape areas 318 and 324 of parcel 306 as shown in FIG. 3G. A user 103 may set landscape area 318 to a low priority because it is just ornamental grass, while landscape area 324 may be set to a higher priority because it contains newly planted trees. The risk factors applied by ESP 120 (through weather prediction engine 220 and irrigation schedule generator 230) may then be set based on the user's priority settings for the various landscape areas.

According to some embodiments, each of the surety assessment parameters may be given a particular weight so that an overall surety of the predicted event (e.g., rain) may be obtained. For illustrative purposes, this surety factor may be expressed in the form of a number from 1 to 10, with 10 indicating a near certainty that the event will take place. Similarly, the risk factor may also be represented by a number from 1 to 10, with 10 indicating a prohibitively high level of risk. The overall prediction facto may therefore be expressed by the ratio:

$$X=S/R$$

Wherein, X is the overall risk factor, S is the surety factor, and R is the risk factor.

Where the overall prediction factor reaches a threshold level, ESP 120 may automatically take actions to adjust the irrigation at the site, for example, by transmitting an update irrigation schedule, transmitting direct control signals to stop or start irrigation, or transmitting notifications to user 103 (e.g., via a management dashboard presented at device 104) providing updates and or instructions on actions to take (e.g., manually adjusting configuration of the irrigation systems or changing physical components such as sprinkler valves at the irrigation site.

Over time, ESP 120 may track prediction factors against actual events and may dynamically adjust assigned prediction factors and/or the ways in which they are weighted using, for example, machine learning algorithms.

According to some embodiments, predicted weather based on the above described concepts, may be applied to the ET determinations used for generating irrigation schedules. For example, an upcoming heavy rain storm may impact the ET equations differently than a predicted light shower even though both involve rain. As long as the surety factor or overall predictive factor is above a certain threshold, the rain may be applied to the ET equation even though it has not yet occurred. For example, if a heavy rain event is predicted to occur within two days, run times on irrigation watering may be reduced until the heavy rain event occurs. In this way, the landscape will dry, thereby increasing the ability of the soil to absorb additional moisture.

The methods described above are done so in the context of predicted precipitation events, however, a person having ordinary skill will recognize that similar methods may be applied to temperature events (e.g., freezing) and wind events.

API and Integration with Third-Party Services and Products

According to some embodiments, third-party providers may integrate their products and/or services into ESP 120 via an application programming interface (API). In this way, ESP 120 may operate as a hardware agnostic platform. Manufactures and vendors of legacy irrigation systems 170, smart irrigation systems 180, smart converters 107, smart ICUs 106, and sensors 108 may integrate their hardware platforms with functionality provided through ESP 120 via software implementing one or more APIs.

Background Information on Computer Systems and Devices

Figure 7:
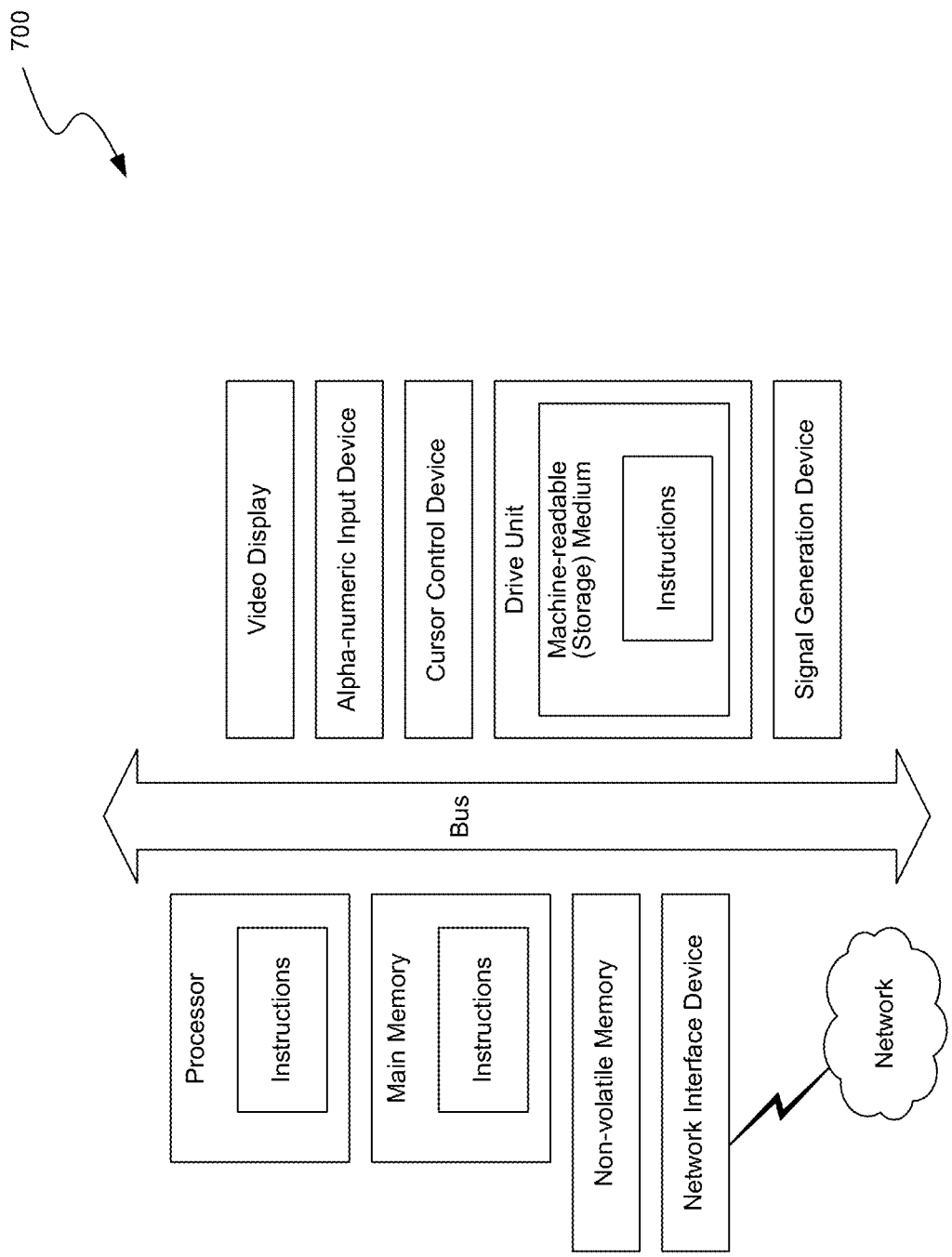
FIG. 7 depicts a diagrammatic representation of computer system or device suitable for implementing an ESP.

FIG. 7 shows a diagrammatic representation of a machine 700 in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine may be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed repository, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 700 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Disclaimers

The description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Additional Remarks

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes some embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing some features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms.

Accordingly, the actual scope of the disclosure encompasses not only the disclosed embodiments, but also all equivalent ways of practicing or implementing the disclosure under the claims.

While some aspects of the disclosure may be presented herein in some claim forms, the inventors contemplate the various aspects of the disclosure in any number of claim forms. For example, while only one aspect of the disclosure is recited as a means-plus-function claim under 35 U.S.C. § 112(f), other aspects can likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

What is claimed is:

1. A computer-implemented method comprising the steps of:
    maintaining, by a processing system, one or more key-value databases having metadata associated with available data from a plurality of data sources, the plurality of data sources including a plurality of remote third-party data sources, sensors located at a plurality of physical locations, and site survey data;
    receiving, via the network, at least a subset of available data from a plurality of data sources; and storing, in one or more key-value databases, at least the subset of available data including metadata collected from the plurality of data sources;
    receiving, via a network, site survey data associated with a physical location; wherein the site survey data includes data entered via an interactive site survey interface presented at a network connected device;
    determining, by a processor, relevant data associated with the physical location based on identified correlations between the site survey data and available data from a data source, the available data including landscape data and environmental data; and
    providing an environmental management service, the environmental management service based in part on the relevant data associated with the physical location.

2. The computer-implemented method of claim 1, wherein landscape data includes one or more of, soil data, geographic data, geological data, topographical data, or plant data.

3. The computer-implemented method of claim 2, wherein environmental data includes one or more of, climate data, weather data, sunlight data, natural resource data, or ecological data.

4. The computer-implemented method of claim 1, wherein, the received site survey data includes one or more of:
    an address or positioning coordinate of the physical location;
    a defined boundary of a landscape area located at the physical location; or
    defined landscape characteristics associated with the physical location, the landscape characteristics including one or more of:
        information associated with installed or planned irrigation system equipment at the physical location including one or more of an irrigation control unit, a smart controller converter, a sprinkler valve, or a sensor;
        information associated with current or planned features of the physical location, including one or more of plant types, soil type, topography, natural resources, or shaded areas; or
        information associated with current or planned features of land surrounding the physical location, including one or more of plant types, soil type, topography, natural resources, or shaded areas.

5. The computer-implemented method of claim 1, further comprising: receiving, via the network, sensor data gathered by a sensor associated with the physical location; wherein the provided environmental management service is based further in part on the received sensor data.

6. The computer-implemented method of claim 1, wherein, the data source is one of the plurality of remote third-party data sources.

7. The computer-implemented method of claim 6, wherein the plurality of remote third-party data sources include one or more of, educational data sources, research institution data sources, weather forecast service data sources, geographic information service data sources, government records data sources, utility data sources, or plant taxonomy data sources.

8. The computer-implemented method of claim 1, wherein determining relevant data associated with the physical location includes:
    invoking a distributed computing cluster to process the available data to determine the relevant data associated with the physical location.

9. The computer-implemented method of claim 1, further comprising: generating, by a processor, an optimized irrigation plan based in part on the relevant data associated with the physical location; and providing access, via the network, to the optimized irrigation plan.

10. The computer-implemented method of claim 9, wherein the optimized irrigation plan is generated to minimize water usage at the physical location.

11. The computer-implemented method of claim 9, wherein the available data includes data from a water utility, and wherein the optimized irrigation plan is generated to minimize expenditures on water at the physical location.

12. The computer-implemented method of claim 9, wherein the optimized irrigation plan includes one or more of:
    current water usage and expenditure data;
    historical water usage and expenditure data; or
    predicted water usage and expenditure data.

13. The computer-implemented method of claim 9, wherein the optimized irrigation plan includes recommendations for one or more of:
    alternative plant varieties and plant coverage layouts;
    alternative soil types;
    agriculture related products and services, including irrigation related products and services; or
    irrigation schedules;
    wherein, the recommendations are generated to minimize water usage at the physical location.

14. The computer-implemented method of claim 1, further comprising: generating, by a processor, an irrigation schedule configured for use by an irrigation control unit located the physical location; and transmitting, via a network, data associated with the irrigation schedule to the irrigation control unit.

15. The computer-implemented method of claim 1, further comprising: transmitting, via a network, at least a subset of the relevant data associated with the physical location to an irrigation control unit at the physical location; wherein the at least subset of the relevant data is used by the irrigation control unit at the physical location to generate an irrigation schedule.

16. The computer-implemented method of claim 1, further comprising: providing access, via the network, to an interactive site management dashboard; wherein, the site management dashboard includes one or more of: an overall status update; an event log, including snapshot insights; a map of the physical location including one or more network-connected assets; options to remotely control one or more of the network connected assets; energy or water usage data; or a performance index score, the performance index score being a quantified score indicating the efficiency of water and/or energy use at the physical location.

17. A computer-implemented method for providing an interactive interface for irrigation management, the method comprising the steps of:
presenting, via a display associated with a network-connected device, an option to input a location of a parcel of land;
receiving, via an input device associated with the network-connected device, a selection of the location of the parcel of land;
presenting, via the display, a map of the parcel of land and surrounding areas, and relevant data associated with the parcel of land;
presenting, via the display associated with the network-connected device, an option to define a boundary of the parcel of land and landscape characteristics of the parcel of land;
presenting, via the display associated with the network-connected device, a defined boundary and landscape characteristics of the parcel of land; and
transmitting, via a network interface associated with the network-connected device, defined boundary and landscape characteristics of the parcel of land to a cloud-based environmental services platform,
wherein the cloud-based environmental services platform is configured to maintain one or more key-value databases having metadata associated with available data from a plurality of data sources, the plurality of data sources including a plurality of remote third-party data sources, sensors located at a plurality of physical locations, and site survey data and to receive at least a subset of available data from a plurality of data sources; and store, in one or more key-value databases, at least the subset of available data including metadata collected from the plurality of data sources;
wherein the relevant data is determined based on identified correlations between the location of the parcel and available data from a remote data source, wherein the available data includes landscape data and environmental data; and
providing an environmental management service, the environmental management service based in part on the relevant data.

18. A system for providing environmental management services using available data from a plurality of data sources, the system comprising:
one or more key-value databases having metadata associated with available data from a plurality of data sources, the plurality of data sources including a plurality of remote third-party data sources, sensors located at a plurality of physical locations, and site survey data;
a network interface;
a processor; and
a memory unit having instructions stored thereon, which when executed by the processor causes the system to:
receive, via the network, at least a subset of available data from a plurality of data sources; and store, in one or more key-value databases, at least a subset of available data including metadata collected from the plurality of data sources;
receive, via the network interface, site survey data associated with a physical location; wherein the site survey data includes data entered via an interactive site survey interface presented at a network-connected device;
determine relevant data associated with the physical location based on correlations between the site survey data and available data from a data source, wherein the available data includes landscape data and environmental data; and
provide an environmental management service, the environmental management service based in part on the relevant data associated with the physical location.

\* \* \* \* \*